US010754941B2

(12) United States Patent
Angal

(10) Patent No.: US 10,754,941 B2
(45) Date of Patent: Aug. 25, 2020

(54) USER DEVICE SECURITY MANAGER

(71) Applicant: eBay Inc., San Jose, CA (US)

(72) Inventor: Rajeev Angal, San Jose, CA (US)

(73) Assignee: eBay Inc., San Jose, CA (US)

( * ) Notice: Subject to any disclaimer, the term of this patent is extended or adjusted under 35 U.S.C. 154(b) by 37 days.

(21) Appl. No.: 14/951,167

(22) Filed: Nov. 24, 2015

(65) Prior Publication Data

US 2016/0078214 A1 Mar. 17, 2016

Related U.S. Application Data

(63) Continuation of application No. 13/709,705, filed on Dec. 10, 2012, now Pat. No. 9,230,089.

(60) Provisional application No. 61/671,985, filed on Jul. 16, 2012.

(51) Int. Cl.
*G06F 21/44* (2013.01)
*H04L 29/06* (2006.01)

(52) U.S. Cl.
CPC .............. *G06F 21/44* (2013.01); *H04L 63/10* (2013.01); *H04L 63/12* (2013.01)

(58) Field of Classification Search
CPC ..... H04L 63/08; H04L 63/10; H04L 63/0861; G06F 21/30; G06F 21/31; G06F 21/62; G06F 21/60; G06F 21/44
USPC ......... 380/1, 247; 713/182, 185; 726/2, 4-5, 726/9, 29-30
See application file for complete search history.

(56) References Cited

U.S. PATENT DOCUMENTS

| 6,421,453 B1 | 7/2002 | Kanevsky et al. |
| 6,957,199 B1 | 10/2005 | Fisher |
| 7,086,008 B2 | 8/2006 | Capps et al. |
| 7,272,259 B2 | 9/2007 | Houle et al. |

(Continued)

FOREIGN PATENT DOCUMENTS

| CN | 1773413 A | 5/2006 |
| CN | 101621518 A | 1/2010 |

(Continued)

OTHER PUBLICATIONS

"U.S. Appl. No. 13/436,684, Examiners Answer to Appeal Brief dated Apr. 1, 2016", 7 pgs.

(Continued)

*Primary Examiner* — Simon P Kanaan
(74) *Attorney, Agent, or Firm* — Shook, Hardy & Bacon LLP

(57) ABSTRACT

Techniques for authentication and authorization of a user, an application, or a user device for access to web resources are described. For example, a machine identifies an access request to access a remote resource associated with a web service. The access request may be received from an application executing at a user device. The machine retrieves at least one user artifact from a security manager identifier received from the web service. The machine performs fingerprinting of the user device based on the at least one user artifact. The machine transmits the access request to the web service based on the performing of the fingerprinting of the user device. The machine, in response to the transmitting of the access request to the web service, receives a resource access authorization from the web service for the application executing at the user device.

20 Claims, 15 Drawing Sheets

(56) References Cited

U.S. PATENT DOCUMENTS

| | | | |
|---|---|---|---|
| 7,392,536 | B2 | 6/2008 | Jamieson et al. |
| 7,437,677 | B1 | 10/2008 | Capps et al. |
| 7,468,729 | B1 | 12/2008 | Levinson |
| 7,484,176 | B2 | 1/2009 | Blattner et al. |
| 7,636,755 | B2 | 12/2009 | Blattner et al. |
| 7,685,237 | B1 | 3/2010 | Weaver et al. |
| 7,702,023 | B2 | 4/2010 | Sutskover et al. |
| 7,703,023 | B2 | 4/2010 | O'Mahony et al. |
| 7,823,208 | B2 | 10/2010 | DeMello et al. |
| 7,865,449 | B2 | 1/2011 | Tattan et al. |
| 7,908,554 | B1 | 3/2011 | Blattner |
| 8,375,331 | B1 | 2/2013 | Mayers |
| 9,230,089 | B2 | 1/2016 | Angal |
| 2003/0012435 | A1* | 1/2003 | Forde ............... G06K 9/00228 382/167 |
| 2003/0014631 | A1 | 1/2003 | Sprague |
| 2003/0023880 | A1 | 1/2003 | Edwards et al. |
| 2003/0131260 | A1 | 7/2003 | Hanson et al. |
| 2005/0120201 | A1* | 6/2005 | Benaloh ............... G06F 21/31 713/155 |
| 2005/0210270 | A1 | 9/2005 | Rohatgi et al. |
| 2006/0036951 | A1 | 2/2006 | Marion et al. |
| 2007/0239522 | A1 | 10/2007 | Kunz et al. |
| 2008/0019353 | A1 | 1/2008 | Foote |
| 2008/0189793 | A1* | 8/2008 | Kirkup ............... G06F 21/53 726/27 |
| 2010/0005291 | A1 | 1/2010 | Hulten et al. |
| 2010/0053187 | A1 | 3/2010 | Arrasvuori |
| 2010/0138904 | A1 | 6/2010 | Anguiano Jimenez |
| 2010/0205448 | A1* | 8/2010 | Tarhan ............... G06F 21/33 713/185 |
| 2010/0251127 | A1 | 9/2010 | Geppert et al. |
| 2010/0281427 | A1 | 11/2010 | Ghosh et al. |
| 2011/0025807 | A1 | 2/2011 | Rice |
| 2011/0246950 | A1 | 10/2011 | Luna et al. |
| 2011/0311095 | A1 | 12/2011 | Archer |
| 2012/0016850 | A1* | 1/2012 | Borden ............ G06F 17/30097 707/695 |
| 2012/0023573 | A1 | 1/2012 | Shi |
| 2013/0139233 | A1* | 5/2013 | Maity ............... H04L 63/08 726/7 |
| 2013/0152155 | A1 | 6/2013 | Donfried et al. |
| 2013/0159413 | A1* | 6/2013 | Davis ............... H04L 29/0872 709/204 |
| 2013/0263237 | A1 | 10/2013 | Kumaraswamy |
| 2014/0020070 | A1 | 1/2014 | Angal |

FOREIGN PATENT DOCUMENTS

| | | |
|---|---|---|
| CN | 101853132 A | 10/2010 |
| CN | 101951385 A | 1/2011 |
| JP | 2009-116454 A | 5/2009 |
| KR | 1020100026380 A | 3/2010 |
| KR | 10-1830038 B1 | 2/2018 |
| WO | WO-2008074133 A1 | 6/2008 |
| WO | WO-2011025807 A1 | 3/2011 |
| WO | WO-2013149048 A2 | 10/2013 |
| WO | WO-2013149048 A3 | 10/2013 |

OTHER PUBLICATIONS

"U.S. Appl. No. 13/436,684—Reply Brief filed May 12, 2016 in response to Examiner's Answer dated Apr. 1, 2016.", 12 pgs.
"Canadian Application Serial No. 2,861,656, Response filed Apr. 19, 2016 to Office Action dated Oct. 23, 2015", 15 pgs.
"Korean Application Serial No. 2014-7030305, Response filed Apr. 15, 2016 to Office Action dated Feb. 15, 2016", (English Translation of Claims), 24 pgs.
"Australian Application Serial No. 2015249192, First Examiner Report dated Aug. 26, 2016", 3 pgs.
"Australian Application Serial No. 2015249192, Response filed Dec. 15, 2016 to First Examiner Report dated Aug. 26, 2016", 17 pgs.
"Australian Application Serial No. 2015249192, Subsequent Examiners Report dated Jan. 25, 2017", 3 pgs.
"Canadian Application Serial No. 2,861,656, Office Action dated Sep. 2, 2016", 3 pgs.
"Canadian Application Serial No. 2,861,656, Response filed Jan, 9, 2017 to Office Action dated Sep. 2, 2016", 17 pgs.
"Chinese Application Serial No. 201380014870.8, Office Action dated Dec. 19, 2016", with English Translation, 13 pgs.
"Korean Application Serial No. 2014-7030305, Final Office Action dated Aug. 17, 2016", W/English Translation, 7 pgs.
"Korean Application Serial No. 2014-7030305, Request for Re-Examination field Nov. 16, 2016", (With English Translation), 27 pgs.
"European Application Serial No. 13768822.2, Extended European Search Report dated Jan. 20, 2016", 6 pgs.
"Korean Application Serial No. 2014-7030305, Office Action dated Feb. 15, 2016", with English Translation of claims, 11 pgs.
"U.S. Appl. No. 13/436,684, Advisory Action dated May 21, 2015", 3 pgs.
"U.S. Appl. No. 13/436,684, Appeal Brief filed Nov. 25, 2015", 27 pgs.
"U.S. Appl. No. 13/436,684, Decision on Pre-Appeal Brief Request dated Sep. 25, 2015", 2 pgs.
"U.S. Appl. No. 13/436,684, Examiner Interview Summary dated Apr. 9, 2014", 10 pgs.
"U.S. Appl. No. 13/436,684, Examiner Interview Summary dated Sep. 19, 2013", 3 pgs.
"U.S. Appl. No. 13/436,684, Final Office Action dated Feb. 6, 2015", 30 pgs.
"U.S. Appl. No. 13/436,684, Final Office Action dated Feb. 11, 2014", 23 pgs.
"U.S. Appl. No. 13/436,684, Non Final Office Action dated Jul. 31, 2013", 19 pgs.
"U.S. Appl. No. 13/436,684, Non Final Office Action dated Sep. 25, 2014", 29 pgs.
"U.S. Appl. No. 13/436,684, Pre-Appeal Brief Request filed Aug. 6, 2015", 6 pgs.
"U.S. Appl. No. 13/436,684, Response filed Apr. 10, 2014 to Final Office Action dated Feb. 11, 2014", 15 pgs.
"U.S. Appl. No. 13/436,684, Response filed May 4, 2015 to Final Office Action dated Feb. 6, 2015", 15 pgs.
"U.S. Appl. No. 13/436,684, Response filed Oct. 31, 2013 to Non Final Office Action dated Jul. 31, 2013", 11 pgs.
"U.S. Appl. No. 13/436,684, Response filed Dec. 26, 2014 to Non Final Office Action dated Sep. 25, 2014", 14 pgs.
"U.S. Appl. No. 13/709,705, Examiner Interview Summary dated Jun. 18, 2014", 3 pgs.
"U.S. Appl. No. 13/709,705, Examiner Interview Summary dated Dec. 17, 2014", 3 pgs.
"U.S. Appl. No. 13/709,705, Final Office Action dated Sep. 12, 2014", 31 pgs.
"U.S. Appl. No. 13/709,705, Non Final Office Action dated Jan. 17, 2014", 28 pgs.
"U.S. Appl. No. 13/709,705, Notice of Allowance dated Aug. 31, 2015", 17 pgs.
"U.S. Appl. No. 13/709,705, Response filed Jun. 17, 2014 to Non Final Office Action dated Jan. 17, 2014", 17 pgs.
"U.S. Appl. No. 13/709,705, Response filed Dec. 12, 2014 to Final Office Action dated Sep. 12, 2014", 22 pgs.
"Australian Application Serial No. 2013237959, Office Action dated Jan. 13, 2015", 4 pgs.
"Australian Application Serial No. 2013237959, Response filed Jun. 22, 2015", 17 pgs.
"Chinese Application Serial No. 201380014870.8, Voluntary Amendment filed Nov. 20, 2015", with English machine translation, 18 pgs.
"European Application Serial No. 13768822.2, Response filed Aug. 28, 2015", 10 pgs.
"International Application Serial No. PCT/US2013/034429, International Preliminary Report on Patentability dated May 21, 2015", 8 pgs.
"International Application Serial No. PCT/US2013/034429, International Search Report dated Aug. 26, 2013", 4 pgs.

(56) References Cited

OTHER PUBLICATIONS

"International Application Serial No. PCT/US2013/034429, Invitation to Pay Additional Fees and Partial Search Report dated Jun. 27, 2013", 2 pgs.

"International Application Serial No. PCT/US2013/034429, Written Opinion dated Aug. 26, 2013", 6 pgs.

"Lastpass User Manual: An Easy to Understand Guide on How to Use Lastpass", [Online]. Retrieved from the Internet: <helpdesk.lastpass.com/fill-form-basics/>, (Accessed Feb. 25, 2013), 4 pages.

"U.S. Appl. No. 13/436,684, Appeal Decision dated Mar. 30, 2017", 9 pgs.

"Australian Application Serial No. 2015249192, Subsequent Examiners Report Response dated May 12, 2017", 15 pgs.

"Australian Application Serial No. 2015249192, Subsequent Examiners Report dated Jun. 15, 2017", 4 pgs.

"Chinese Application Serial No. 201380014870.8, Office Action Response dated May 2, 2017", W/ English Claims, 14 pgs.

"Korean Application Serial No. 2017-7004774, Office Action dated May 1, 2017", w/English Translation, 22 pgs.

"Korean Application Serial No. 2017-7004774, Office Action Response dated Jun. 30, 2017", w/English Claims, 18 pgs.

Office Action received for Canadian Patent Application No. 2,861,656, dated Jul. 31, 2017, 5 pages.

"Canadian Application Serial No. 2,861,656, Office Action dated Jul. 31, 2017", 19 pgs.

Office Action received for Canada Patent Application No. 2,861,656, dated Jun. 26, 2018, 6 pages.

Response to Canadian Office Action filed on Jan. 22, 2018 for Canadian Patent Application No. 2,861,656, dated Jul. 31, 2017, 19 pages.

"Application Serial No. 2,861,656, Response filed Oct. 16, 2018 to Office Action dated Jun. 26, 2018", 5 pgs.

"Response to Communication Pursuant to Article 94(3) EPC filed on Nov. 12, 2018, for European Patent Application No. 13768822.2, dated Oct. 18, 2018", (Nov. 12 2018), 13 pages.

"Communication Pursuant to Article 94(3) EPC received for European Patent Application No. 13768822.2, dated Oct. 18, 2018", (Oct. 18, 2018), 4 pages.

Office Action received for Canada Patent Application No. 2,861,656, dated Apr. 2, 2019, 4 pages.

European Application Serial No. 19171334.6, Extended European Search Report dated Jul. 1, 2019, 6 pages.

Response to Office Action filed on Sep. 18, 2019, for Canada Patent Application No. 2,861,656, dated Apr. 2, 2019, 8 pages.

Response to Extended European Search Report Filed on Jan. 17, 2020 , for European Patent Application No. 19171334.6, dated Jul. 3, 2019, 19 pages.

Office Action received for Canadian Patent Application No. 2,861,656, dated Jun. 5, 2020, 4 pages.

\* cited by examiner

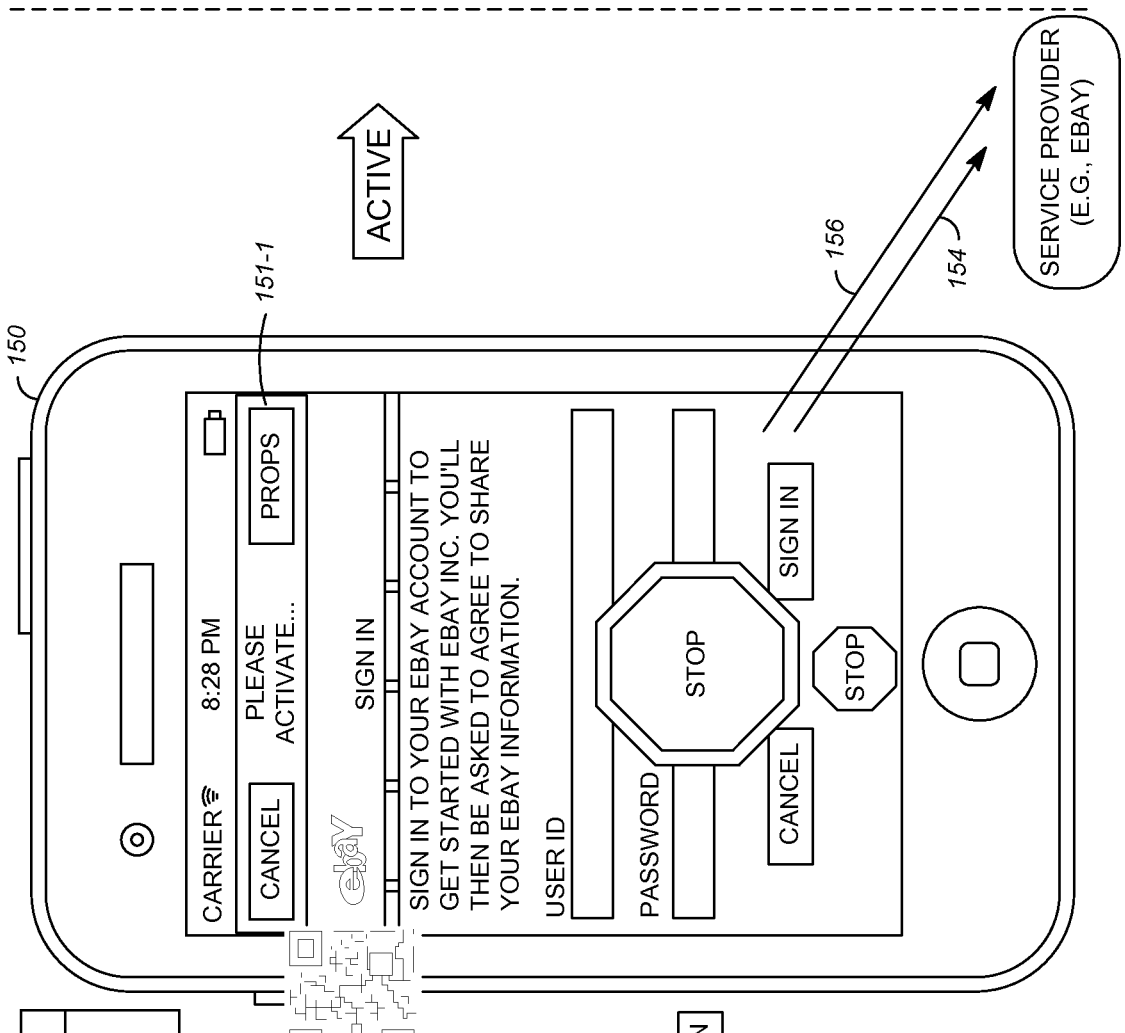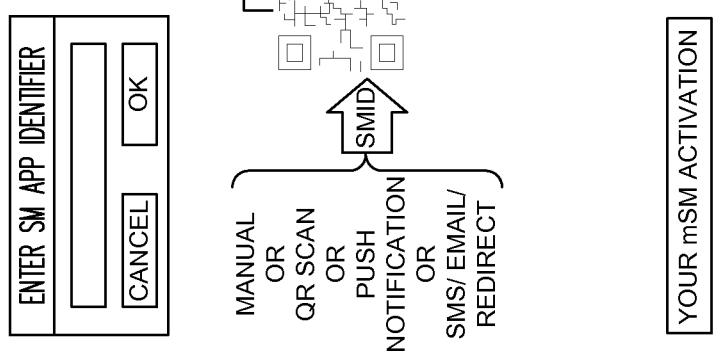
FIG. 1E
FIG. 1D
| FIG. 1DA | FIG. 1DB |

USER DEVICE SECURITY MANAGER

CROSS REFERENCE TO RELATED APPLICATIONS

The present application claims the benefit of priority under 35 U.S.C. § 119(e) of U.S. Provisional Patent Application Ser. No. 61/671,985 filed on Jul. 16, 2012 and entitled "USER DEVICE SECURITY MANAGER," which is hereby incorporated by reference herein in its entirety. The present application may be related to U.S. patent application Ser. No. 13/436,684 filed on Mar. 30, 2012 and entitled "USER AUTHENTICATION AND AUTHORIZATION USING PERSONAS," which is hereby incorporated by reference herein in its entirety.

The present application is a continuation of and claims the benefit of priority under 35 U.S.C. § 120 to U.S. patent application Ser. No. 13/709,705 filed on Dec. 10, 2012 and entitled "USER DEVICE SECURITY MANAGER," which is hereby incorporated by reference herein in its entirety.

TECHNICAL FIELD

The present application relates generally to the technical field of user and/or application security information management and, in various embodiments, to systems and methods for authenticating and/or authorizing a user, an application or a user device for access to web resources.

BACKGROUND

Web services, such as online advertisers, online marketplaces, online payment providers, social network services or other aggregator websites, may deploy technologies to authenticate users, such as receiving user-typed or browser-provided user information (e.g., identifications and passwords) via login web forms provided by the web services. Once the users are properly authenticated, for example, based on determining that the user-typed or browser-provided user information matches stored user information, then the web services may authorize the users for different services based on their identifications. For example, the web services may provide one user with certain services (e.g., functions) while refraining from providing another user with the same services.

BRIEF DESCRIPTION OF THE DRAWINGS

Example embodiments of the present disclosure are illustrated by way of example, and not by way of limitation, in the figures of the accompanying drawings.

FIGS. 1E and 1F illustrate activation of a user device security manager, according to various embodiments.

DETAILED DESCRIPTION

Figure 1A:
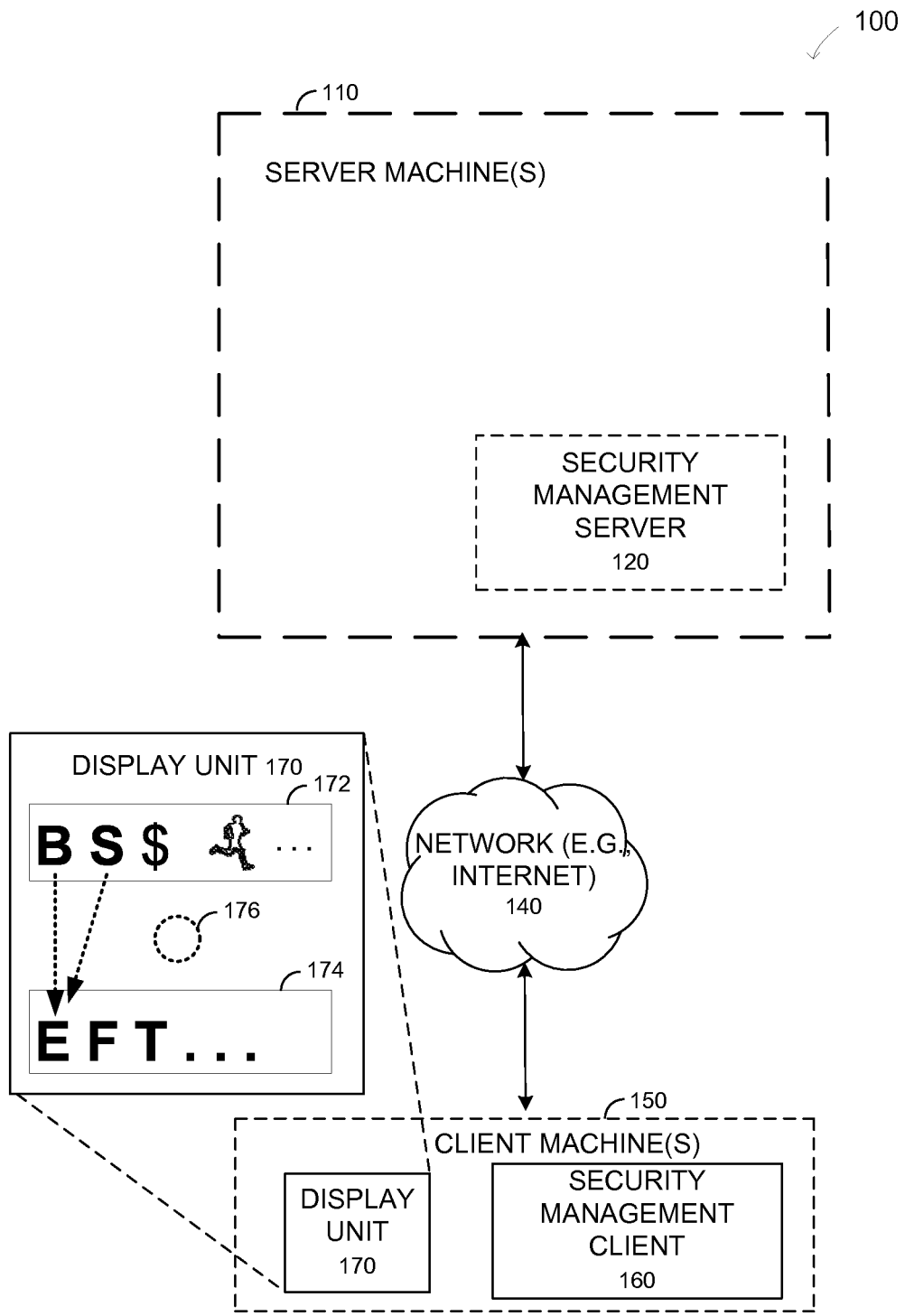
FIG. 1A is a block diagram illustrating a system in a network environment for authenticating and/or authorizing an application, a user or a user device, according to various embodiments.

Example methods and systems to authenticate and authorize a user and/or an application for web resources using user devices, such as mobile devices, are described. In the following description, for purposes of explanation, numerous specific details are set forth in order to provide a thorough understanding of example embodiments. It will be evident, however, to a person of ordinary skill in the art that various embodiments may be practiced without these specific details. Also, it is to be understood that other embodiments may be utilized and that structural, logical and electrical changes may be made without departing from the scope of the embodiments disclosed herein. The following description of example embodiments is, therefore, not to be taken in a limited sense, and the scope of the disclosure is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Currently, authentication of a user and/or an application to a web service, such as e-commerce properties (e.g., eBay) or social networking properties (e.g., Facebook), is embedded within the application itself. In many cases, the application accessing the web service is developed and distributed by a third party developer different from the web service provider 190. Accordingly, the current approach reveals a huge risk of user credentials of the user being illegitimately exposed outside the application, and thereby allows a malicious user or program to use the illegitimately exposed user credentials, causing damage to the user.

In addition, under the existing technologies, once the user and/or the applications are authenticated, the application is provided an access to either all resources of the (backend) web service or a hard-coded application identification-based selection of the resources. This in turn provides the user or the web service provider 190 with less control of how much resources of the web service the user and/or the web service provider 190 are going to allow for the application.

Furthermore, under the existing technologies, as noted above, since the authentication mechanism to access the web service is embedded in the application itself, repairing a detected flaw or adding a new functionality in the authentication mechanism incurs redistributing the application to a number of users again. This problem can be aggravated, for example, when the change in the authentication mechanism is due to the change in the web service, and not in the (third party's) application.

Apparatus and methods according to various embodiments disclosed herein propose addressing at least the above described problems, as well as other problems. In various embodiments, for example, a user device security manager, such as a "mobile Security Manager (mSM)," is proposed, for example, to explicitly separate user authentication and/or authorization from the application accessing the web service providing the backend web (e.g., e-commerce or social networking) services. For example, the user device security manager (e.g., mSM), according to various embodiments, may authenticate the application and/or its user, implementing a mobile single-sign-on (SSO), and establish a trust relationship with the backend web services on behalf of the application and/or the user so that once authenticated, the application may access only what it is allowed to.

In various embodiments, for example, the user device security manager executing at a user device corresponding to a user of a web service may identify (or detect) a first request issued from an application to access remote resources associated with the web service. The application may execute at the user device, and be separate from the user device security manager. The user device security manager may acquire security information associated with the application in response to the identification of the first request. The security information may include at least one of identification, an access scope or a nonce for the application. A second request may be transmitted from the user device security manager to the web service to authenticate the application by the web service based at least in part, on the application identification.

In various embodiments, the methods may be optimized to be performed on smartphones executing smartphone operating systems, such as iOS, Android, and Windows, etc. In various embodiments, the methods may be optimized to be performed on a tablet computing device, such as the Apple iPad™, tablet computing devices operating the Android™ operating system, and tablet computing devices operating the Blackberry™ operating system and the WebOS™ operating system. In some embodiments, the methods may be performed on other computing devices such as smart phones, mobile devices, laptops, desktop computers, and so forth. Various embodiments that incorporate these mechanisms are described below with respect to FIGS. 1A-6.

It is noted that particular web services, such as eBay and Facebook, are used as an example for the description, and that the embodiments described herein may be applicable to any other web services or applications utilizing web services. In various embodiments, "the company" to represent any company that wishes to use various embodiments, for example, to protect its mobile users and itself while facilitating access to the company hosted resources from the mobile device. These "resources" may comprise at least one of company data, user data, web services (SOAP/REST/and so on), any service, or transactions and so on.

FIG. 1A is a block diagram illustrating a system 100 in a network environment for user authentication and authorization using personas, such as a set of artifacts related to a user, according to various embodiments. The system 100 may include one or more server machines 110 connected through a network (e.g., the Internet) 140 to one or more client machines 150, such as personal computers (PCs), notebooks, netbooks, tablet PCs, servers, cell phones (e.g., smart phones), personal digital assistants (PDAs), televisions (TVs) or set top boxes, etc.

The server machines 110 may comprise a security management server 120 and one or more web service platforms, such as a network-based trading platform (e.g., eBay). In various embodiments, the network-based trading platform may provide one or more marketplace applications, payment applications, and other resources. The marketplace applications may provide a number of marketplace functions and services to users that access the marketplace. The payment applications, likewise, may provide a number of payment services and functions to users. The network-based trading platform may display various items listed on the trading platform.

The embodiments discussed in this specification are not limited to network-based trading platforms. In other embodiments, other web service platforms, such as a social networking websites, news aggregating websites, web portals, network-based advertising platforms, or any other system that provide web services to users, may be employed. Furthermore, more than one platform may be supported by each security management server 120 and each platform may reside on a separate server machine 110 from the security management server 120. It is also noted that web services, according to various embodiments, may include any heterogeneous/disparate web services across the internet, and may not be just confined to within the enterprise that hosts the security management server 120.

The client machine 150 may host a security management client 160. In various embodiments, the security management client 160 may be a web browser or a native application, such as a gadget program, that operates in a background of the computing environment of the client machine 150 or a combination thereof. The client machine 150 may be configured to permit a user to access the various applications, resources, and capabilities of the web services via the security management client 160.

The client machine 150 may also comprise a display unit 170 that receives a selection of a persona from a plurality of persona symbols 172 and 176 to access the web services represented in the form of service symbols 174. In various embodiments, the display unit 170 may comprise a touch screen device capable of capturing a user's finger or electronic movements thereon. More detailed explanations regarding the security management client 160, security management server 120 and the display unit 170 are provided below in detail with respect to FIGS. 2A-5.

It is noted that while FIG. 1A illustrates the client machine 150 and the server machine 110 in a client-server architecture, other embodiments are not limited to this architecture, and may equally find applications in a distributed, peer-to-peer, or standalone architectures.

Figure 1B:
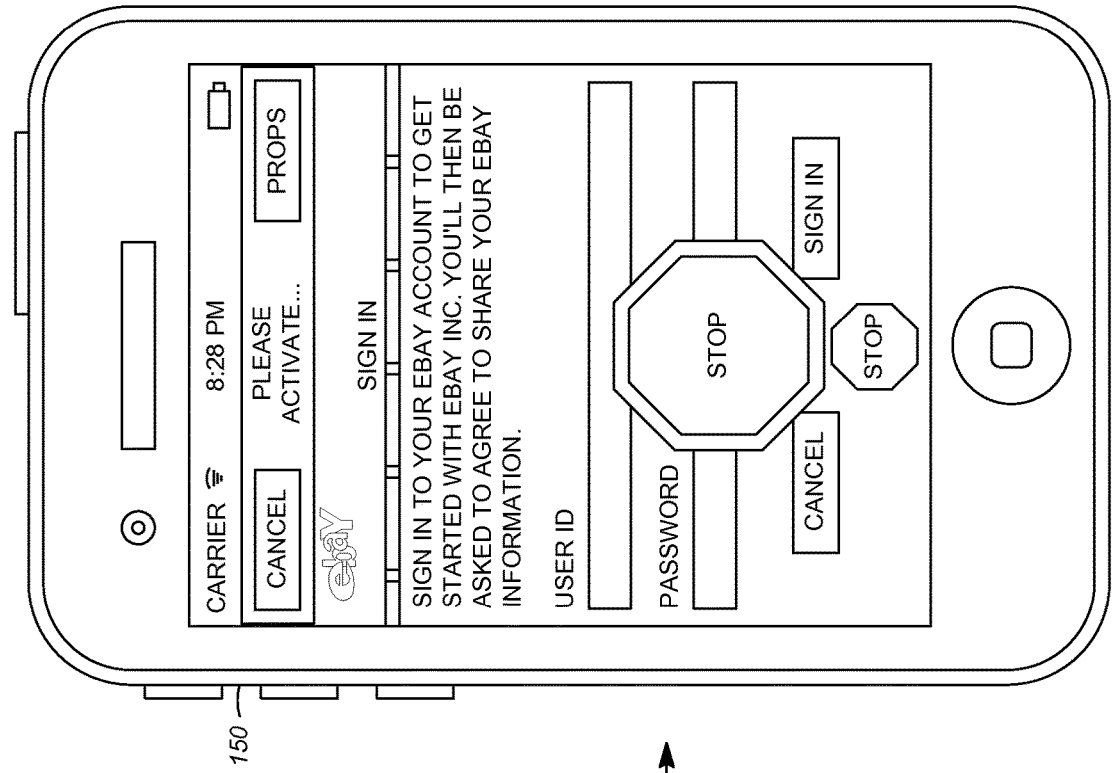
FIG. 1B illustrates a client machine in the form of a smartphone in a mobile landscape, according to various embodiments.
Figure 1B:
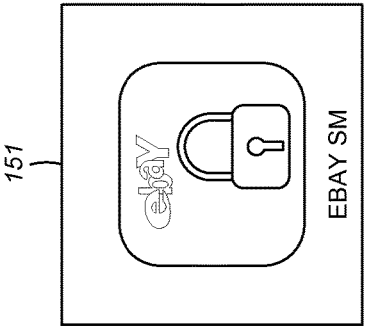

FIG. 1B is a block diagram that illustrates the client machine 150 in the form of a smartphone in a mobile landscape, according to various embodiments. In some embodiments, a user device security manager 151 (e.g., mSM), such as the security management client 160, may be downloaded from a trusted application store or a marketplace platform, such as eBay, Apple, Android, or a third party web site. The download operation may be performed in response to a request by a user of the client machine 150. The user device security manager 151 (e.g., mSM) may comprise a native application configured to run on one or more certain operating systems.

In some embodiments, for example, the user device security manager 151 (e.g., mSM) may be in the form of an html (e.g., html5) application. In such a case, no explicit download, installation, or activation of the user device security manager 151 may be needed. Instead, the user can simply access the user device security manager 151 using his mobile web browser via a uniform resource locator associated with the user device security manager 151. In other embodiments, for example, the user device security manager 151 (e.g., mSM) may be in the form of a native application that is embedded in an existing (e.g., trusted) application. The user device security manager 151 (e.g., mSM), in the form of the html application or the native embedded form, may provide various features, such as device identification, authentication mechanisms and so on. The user device security manager 151 (e.g., mSM) may be initially inactive (e.g., in "UnActivated state") until it is activated on the client machine 150, for example, by its user. More information regarding registering or activating the user device security manager 151 (e.g., mSM) is provided below with respect to FIGS. 1C-1G.

Figure 1C:
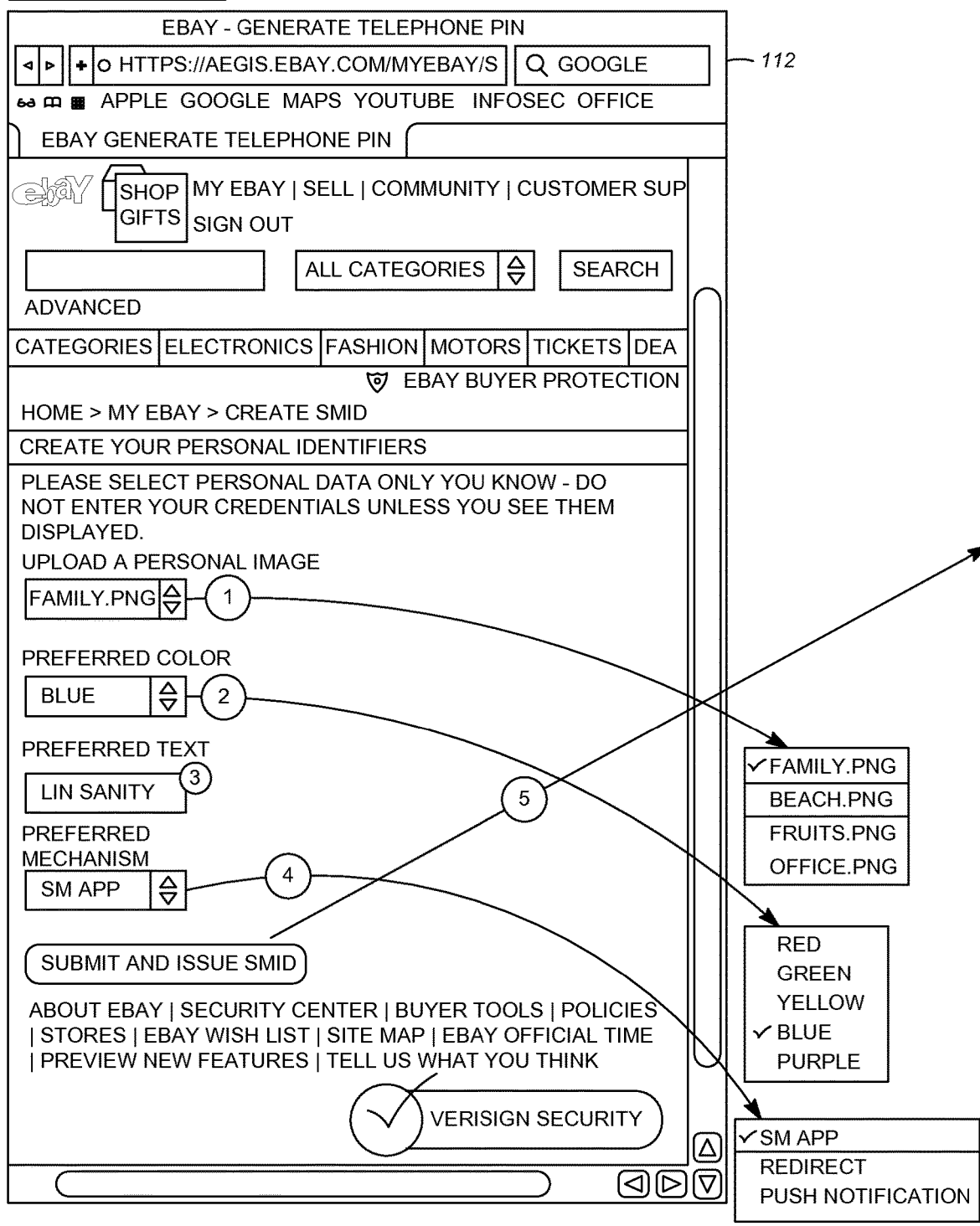
FIGS. 1C and 1D illustrate registration of a user device security manager, according to various embodiments.
Figure 1D:
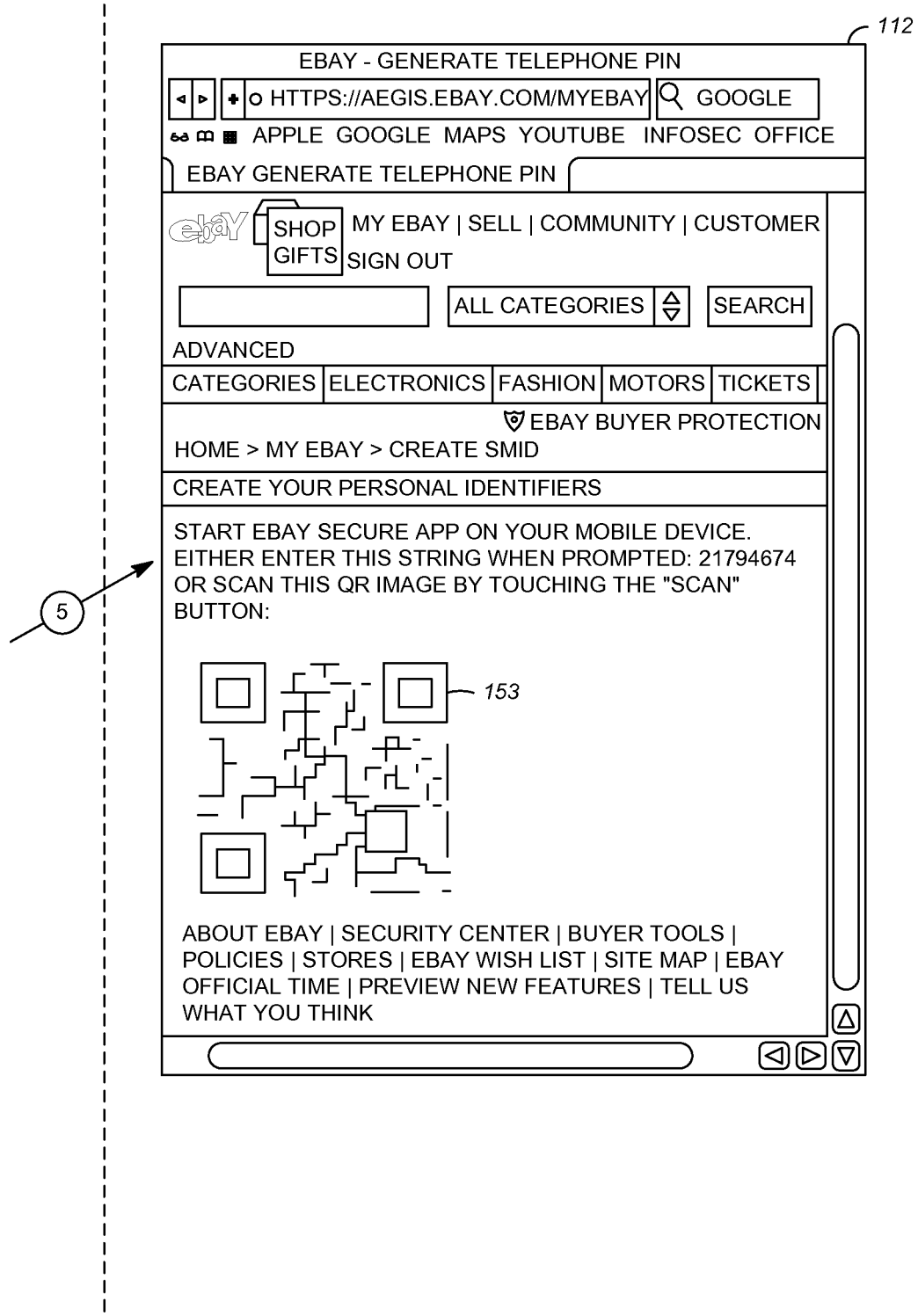

FIGS. 1C and 1D are block diagrams that illustrate different ways to register the user device security manager 151, according to various embodiments. The activation operation may protect the user against phishing attacks on the client machine 150, such as a rogue application pretending to be the same user device security manager 151). In one embodiment, a security manager identifier (SMID), representative of a plurality of (e.g., three) user artifacts, may be issued by an associated web site, such as eBay. In another embodiment, in addition to or as alternative to the SMID, an OAuth Token may be issued.

Referring to FIG. 1C, for example, a user may login to the eBay site 112 to register or activate the user device security manager 151 (e.g., mSM). There may be several registration or activation mechanisms (or information) that can be deployed. Specific deployments may us one or more of the registration or activation mechanisms. They may be chosen, for example, based on system capabilities and associated risk levels. In some embodiments, for example, the registration or activation may start with the user logging on to an associated web site (e.g., eBay's "my eBay" site) that provides the user device security manager 151 (e.g., mSM). In one embodiment, the client machine 150 (e.g., a smartphone) itself may be used to log on to the associated web page, for example, via Safari browser in the case of the client machine 150 (e.g., a smartphone) being an iPhone. In another embodiment, a different machine (e.g., a desktop or laptop) may be used for the purpose of the registration or activation.

Once logged-on, certain user related "artifacts" may be transmitted to the associated web site and thus to the user device security manager 151 (e.g., mSM) to register the user. Each of the artifacts may comprise information that is unique to the user, known only to the user, or easily recognizable by the user. Examples of the artifacts may be the user's personal photo, favorite color, or a phrase chosen by the user. Other or additional information may be used. Arrows (1), (2) and (3) in FIG. 1C represent the processes to select the artifacts.

The user may select the form of activation of the user device security manager 151 from a plurality of options, as illustrated by an arrow (4) in FIG. 1C. Since different form factors of the user device security manager 151 (e.g., mSM) may use different mechanism to activate the user device security manager 151. The forms of activation may be dependent on the platform on which the user device security manager 151 (e.g., mSM) is built on. For example, html5 applications may be incapable of receiving push notifications. The forms of activation may be dependent on a choice of an enterprise (e.g., a developer) to activate the user device security manager 151 (e.g., mSM)—the enterprise may not have a SMS capability at all. For example, eBay may choose to support only native application form factor of the user device security manager 151 (e.g., mSM) based on Android and Apple, and only want to support push notification mechanism. In such a case, the "Preferred Mechanism" may have a single "Push Notification" option.

In various embodiments, referring to FIG. 1C, an "SM app" menu option may be used to activate the user device security manager 151 on the client machine 150 as a separate (native) application, for example, in a situation where the user device security manager 151 is developed and owned by a third-party developer, and provided to user via the associated web site (e.g., eBay). When an "Redirect" menu option is selected, any request to activate the user device security manager 151, for example, from the client machine 150 may be redirected to the web site (e.g., eBay) providing the associated services. A "Push Notification" menu option may be used to activate the user device security manager 151 on the client machine 150, for example, only when the user device security manager 151 is owned by the associated web site (e.g., eBay). This allows more reliable and secure ways of data communication between the associated web site and the client machine 150.

When the registration is successfully completed, a security manager identifier (SMID) comprising a string blob that is an encapsulated representation of the artifacts selected by the user, may be generated and issued, for example, by the associated web site (e.g., eBay) based at least in part on the artifacts received from the user, as illustrated by an arrow (5). In one embodiment, for example, the SMID may be generated in the form of QR Code (Quick Response Code) 153. In some embodiments, in addition to the SMID, a token (e.g., AuthN Token) may be optionally assigned to the user device security manager 151 (e.g., mSM). The token may comprise information that is unique to the specific instance of the user device security manager 151 (e.g., mSM) associated with (e.g., installed on) the user's mobile device (e.g., the client machine 150).

Figure 1F:
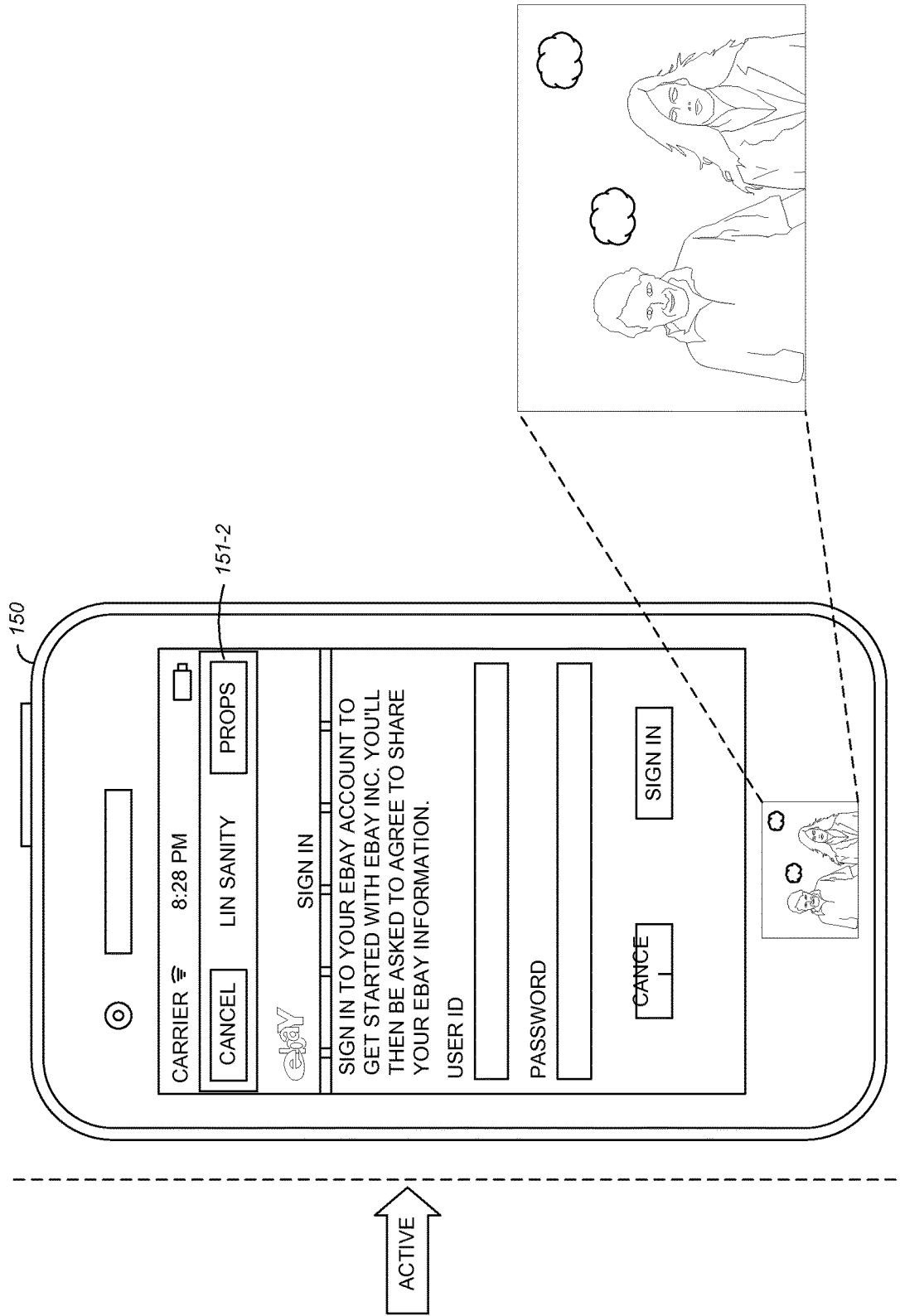

FIGS. 1E and 1F are block diagrams that illustrate different ways to activate the user device security manager 151 through the client machine 150, according to various embodiments. In some embodiments, information to activate the user device security manager 151 in an inactive state 150-1 may be received at the client machine 150. The activation information (e.g., SMID) may be received from one or more of various external input sources. For example, as illustrated in FIG. 1E, the activation information may be in the form of one or more of external resources, such as manual entry by a user of the client machine 150, a QR Code 153 scanned by a QR Code scanner located in the client machine 150, a push notification transmitted from a service provider 190 (e.g., eBay) from which the user device security manager 151 was previously downloaded, an email or a short message service (SMS) message, a redirection from the service provider 190 or a third party service provider 190, and so on.

In some embodiments, the manual entry may be used such that the user can directly type in the SMID to the user device security manager 151, for example, via a relevant user interface page (as shown in FIG. 1E). The QR code scan may be used, for example, when the user device security manager 151 (e.g., mSM) is a native application specific to the operating system of the client machine 150, and when the QR code 153 has been previously generated during the registration process, for example, as described with respect to FIG. 1C. The push notification may be used, for example, when the user device security manager 151 is the native application, and in this case, the artifacts encoded in the SMID may be sent to the client machine 150 as a push notification message, and may be automatically input to the user device security manager 151. The redirection to the user device security manager 151 may be applicable, for example, when the website of the service provider 190 to register artifacts and the user device security manager 151 are associated with the same device (e.g., server). In such a case, the website may invoke the user device security manager 151, and transfer the artifacts thereto, via a redirection. The SMS or email message may be used when the SMID is made available on the client machine 150 via SMS or email, and in that case the SMID may be transferred to the user device security manager 151 via the manual entry or redirect options described above. It is noted that actual implementations of one or more of the above described mechanisms to transmit the artifacts to the user device security manager 151 (e.g., mSM) may be specific to the operating system executing on the client machine 150, such as iOS, Android and so on. It is also noted that one or more of the above described mechanisms, or other mechanisms may be used to transmit the artifact to the user device security manager 151.

The user device security manager 151 (e.g., mSM) may retrieve the artifacts and, optionally, a token from the SMID, execute device fingerprinting operations using the artifacts or token, and send the SMID (or some artifacts retrieved therefrom) to an endpoint of the service provider 190 (e.g., eBay) for verification. In some embodiments, to verify authenticity of its identification, the user device security manager 151 running in the background of the client machine 150 in an inactive state (to the user), may send user-related artifacts retrieved from the activation information (e.g., SMID) or the activation information itself back to the service provider 190 (e.g., eBay) from which the user device security manager 151 was previously downloaded, as illustrated by an arrow 154. In one embodiment, the user device security manager 151 may be activated based on receiving an indication from the service provider 190 that the user-related artifacts transmitted to the service provider 190 are determined to match the artifacts stored in the service provider 190 in relation with the instance of the user device security manager 151 previously downloaded to the client machine 150. In some embodiments, the user device security manager 151 may transmit additional information (e.g., device fingerprinting) to the service provider 190, as illustrated by an arrow 156.

In some embodiments, when activated, the user device security manager 151 may present (e.g., display or sound) via the client machine 150 an indication that the user device security manager 151 is in an active state 150-2. In one embodiment, for example, the user device security manager 151 in the active state 150-2 may present (e.g., display or sound) one or more of artifacts, such as a unique identification (e.g., "Lin Sanity" or a picture), of the user which the user device security manager 151 is tied to (e.g., registered for). The artifacts of the user may be preregistered and associated with the user during the registration process described above with respect to FIG. 1C. In some embodiments, the device security manager 151 may present (e.g., display or sound) visual or audio artifacts every time the user invokes it.

When activated, the user device security manager 151 may present a log-in or authentication page to receive log-in or authentication information from a user of the client machine 150. For example, as shown in FIG. 1E, a user id and a password may be presented. In one embodiment, the user device security manager 151 may support other stronger authentication mechanisms, such as RSA, certificates, one-time password (OTP), biometrics, and so on.

As described above, during or after the activation, the user device security manager 151 may check whether the activation information received from a corresponding resource includes a (optional) token (e.g., AuthN Token) associated with (e.g., registered for) the user. The (optional) token may represent that the user is authenticated on the client machine 150, and hence the user may not need to be prompted for authentication as long as the token remains valid (e.g., until the token expires or is revoked). For example, in one embodiment, if it is determined that the token is present in the activation information (e.g., mSM) and that the token is valid, the user device security manager 151 may not prompt the user with a log-in page, and may automatically login the user to the user device security manager 151 without having the user go through the login process. In such a case, the authentication screen (e.g., web page), as illustrated in FIG. 1F, may not be presented. The user device security manager 151 may simply present a greeting (e.g., "Welcome, John Smith" in the case of the user's name is Jonh Smith) at an appropriate place in a user interface of the user device security manage 151.

In various embodiments, in addition to or as an alternative to the greeting, the user device security manager 151 may present one or more preregistered user artifacts, such as a message comprising a personalized text, that only the user can recognize. For example, the user identified as Jonh Smith may have previously chosen (e.g., registered) "Lin Sanity" as his personalized text, for example, as described with respect to FIG. 1C. In such a case, when the token validation is successfully done, the user device security manager 151 may present "Lin Sanity" at a certain place in the user interface. This allows the user to verify whether the application being displayed in a display and communicating with him is the same user device security manager 151 for which he previously registered. This in turn allows anti-phishing or application authentication by the user, for example. In some embodiments, the (optional) token may be stored in the appropriate secure storage on the client machine 150, for example, as a keychain in the case of the operating system of the client machine 150 being iOS.

When successfully activated based on the user-related artifacts obtained from the activation information (e.g., SMID), the service provider 190 (e.g., eBay or a third-party application provider) may eliminate all traces of the artifacts such that they reside only on the mSM mobile device. This allows preventing unauthorized access to the artifacts of the user, for example, by a hostile program via the service provider 190. The user device security manager 151 may perform additional functions, for example, as the following: facilitate token issuance for other apps on the same device; facilitate user consent on the "scope" which the other applications may have access to; manage token(s). In one embodiment, for example, to facilitate the token issuance for other applications on the same client machine 150, the user device security manager 151 may allow the user to revoke the token(s).

Figure 1G:
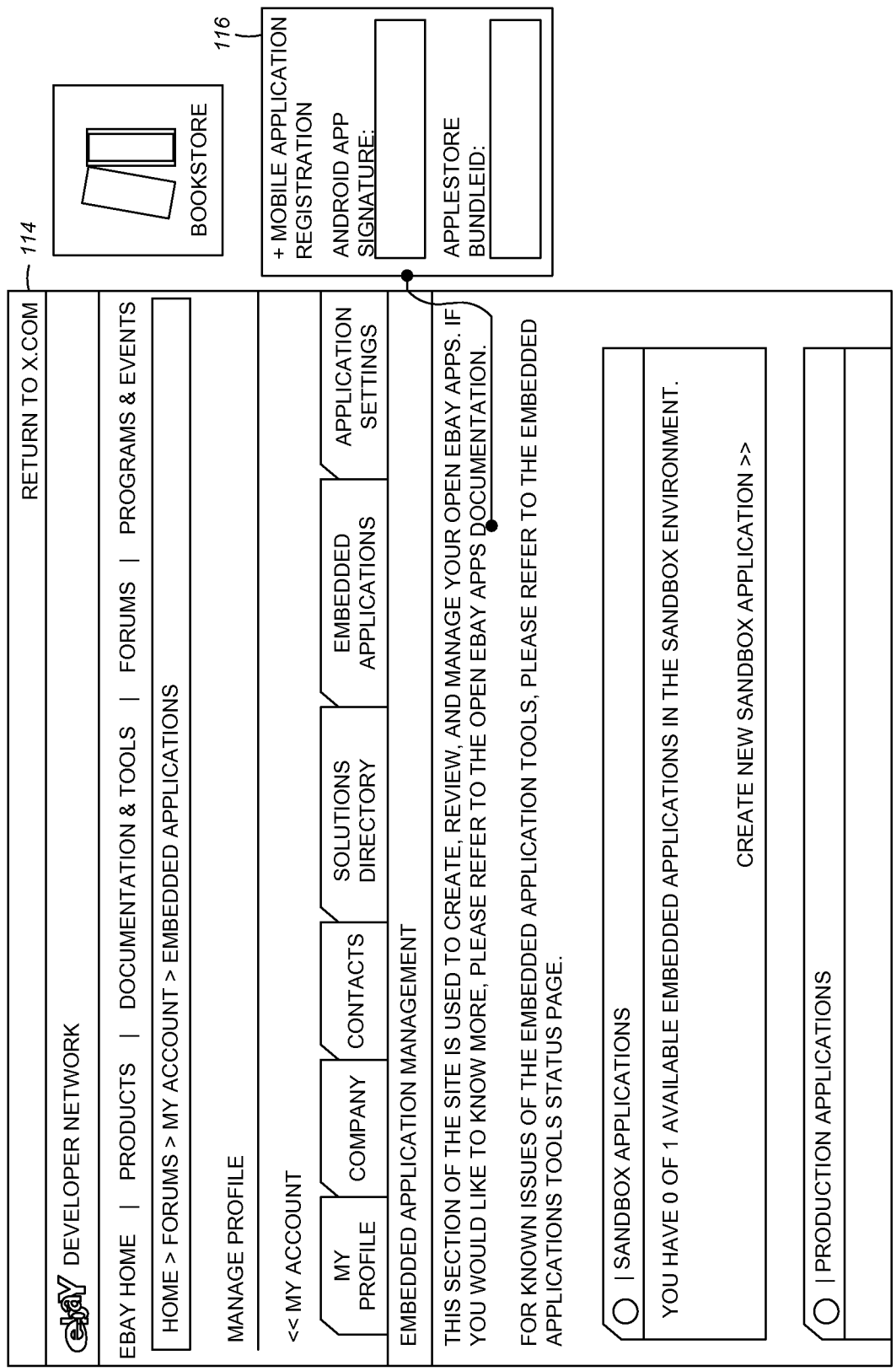
FIG. 1G illustrates registration of an application, according to various embodiments.

FIG. 1G shows registration of an application that may be authenticated or authorized via the user device security manager 151 (e.g., mSM), according to various embodiments. For example, in some embodiments, a Mobile Appstore Identity may be registered in addition to existing eBay AppID for a mobile application, as illustrated in web sites 114. In some embodiments, the mobile application (or a regular non-mobile application) may be built using eBay software development kit (SDK).

The registration of the (mobile or non-mobile) application may be performed, for example, to integrate the application with the user device security manager 151 (e.g., mSM). In one embodiment, the registration may be executed in response to a user input by an application developer/owner of the application via an application registration site, such as developer network site 114 run by a service provider 190 (e.g., eBay), as illustrated in FIG. 1G. In one embodiment, access to the application registration site (e.g., the developer network site 114) may be secured by having the developer/owner login first using his or her developer credentials preregistered with the application registration site 114. It is noted that the application may be one developed by a third party developer partnering with the service provider 190 (e.g., eBay partner developer), by the service provider 190 (e.g., eBay) itself, or by a combination thereof.

Application authentication or authorization may be facilitated at run time such that the user device security manager 151 (or its user) can be sure which specific application the user is interacting with. This prevents fraud, or other attacks like phishing, and facilitates access to only those resources the specific application is authorized to access. The registration of the application may be specific to a platform (e.g., OS) of a (e.g., mobile) user device, such as the client machine 150. Accordingly, the registration of the application may be driven by the runtime facilities provided by the (mobile) user device (e.g., the client machine 150) to perform the verification task securely.

For example, in one embodiment, when the platform of the mobile user device is iOS, an identifier issued by an associated vendor (e.g., AppleStore Bundleid) may be used to register the (mobile) application, as illustrated in FIG. 1G (mobile application registration page 116). The Bundleid is known to be substantially difficult, if not impossible, for a rogue application to spoof. In another embodiment, for example, if the mobile platform is Android, an identifier issued by its associated vendor (e.g., Android App Signature) may be used to register the (mobile) application. Android marketplaces may store downloadable applications each signed by a private key of the developer, and the signatures may be verified by a public key corresponding to the private key. As long as the private keys are not compromised, the signatures (e.g., Android App Signatures) cannot be spoofed.

Figure 1H:
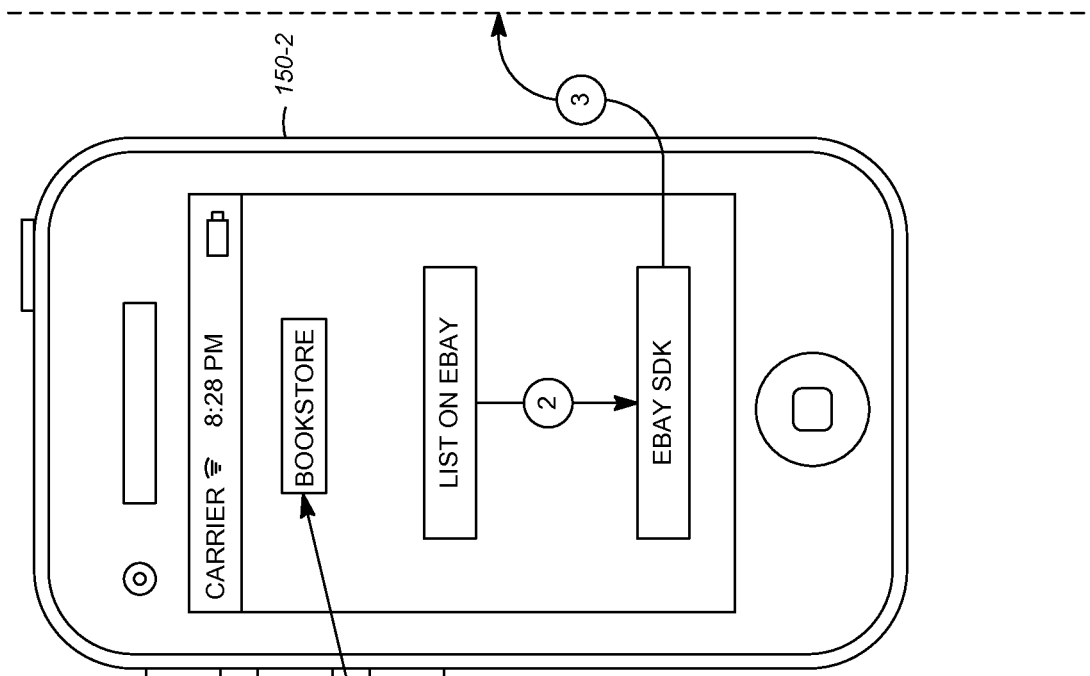
FIGS. 1H and 1I illustrate authentication or authorization of a user, a user device, and an application on the user device, according to various embodiments.
Figure 1H:
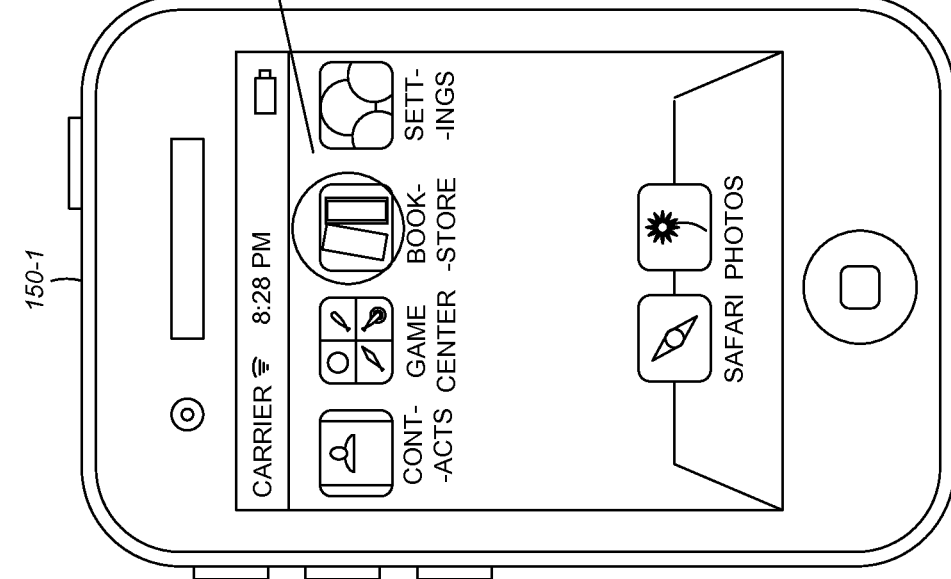
Figure 1I:
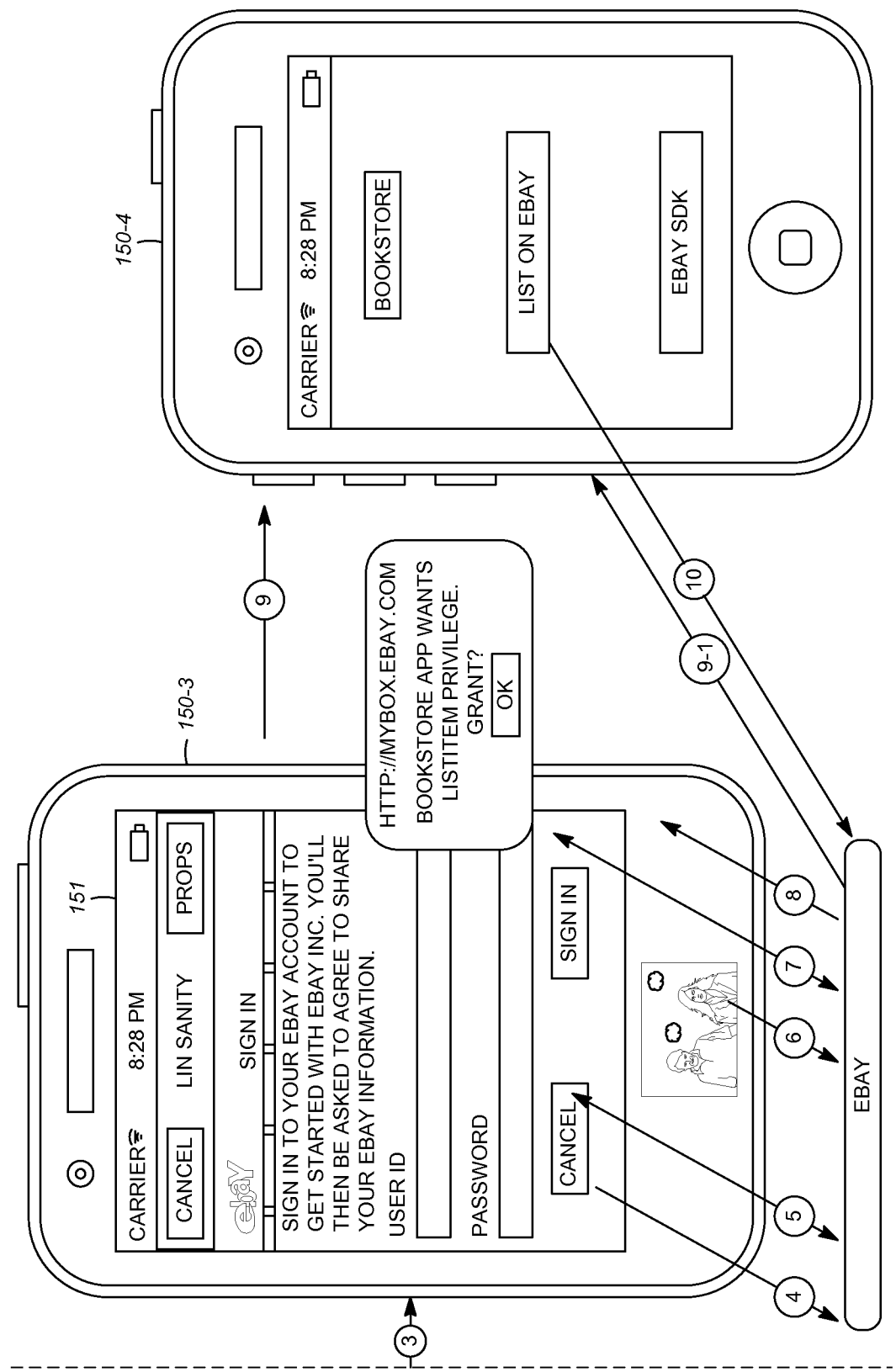

FIGS. 1H and 1I show authentication or authorization of a user, a user device, and an application on the user device using the user device security manager 151, according to various embodiments. When a trust relationship is established between the device security manager 151 (e.g., mSM) and the client machine 150 via download/installation, registration, and activation, for example, as described with respect to FIGS. 1B-1G, the user device security manager 151 may be used to authorize or authenticate an application to be executed on the client machine 150 (e.g., a mobile phone).

In various embodiments, as illustrated in FIG. 1H as 150-1, a user may download an application (e.g., Bookstore) from an application store/marketplace (e.g., eBay), and install it on the client machine 150. The application may be preregistered with a service provider 190 (e.g., eBay) from which the user device security manager 151 is downloaded, as described with respect to FIG. 1G, for example. The user device security manager 151 may be used to facilitate various activities with respect to authentication or authorization of the application to access resources provided by the service provider 190 or a third-party service provider.

In various embodiments, as illustrated in FIG. 1H as 150-2, the user may start the application on the client machine 150 and interact with it (arrow 1). At some point, the application may need to access one or more resources (e.g., get protected data, perform transaction, etc) available via a certain service provider 190, such as eBay (arrow 2). The interaction by the application with the user device security manager 151 (e.g., mSM) may be initiated (arrow 3). This interaction may be performed using, for example, a protocol that may be encapsulated in an SDK included in the application by an application developer (e.g., eBay or a third-party developer). In one embodiment, for example, the application may transmit a request comprising at least one of its own application id (e.g., AppID) issued as part of an application registration operation, for example, as described with respect to FIG. 1G, a scope of the request (e.g., a desired level of access to resources), or a nonce (e.g., random and non-guessable number).

In various embodiments, as illustrated in FIG. 1I as 150-3, in response to an initiation (e.g., the request) from the application, the user device security manager 151 (e.g., mSM) may start and present (e.g., display or sound) one or more artifacts, such as a nick-name (e.g., "Lin Sanity") or a picture, registered for a user of the client machine 150. This allows the user to verify that an application being presented via the client machine 150 is the user device security manager 151 that he legitimately registered previously, as described with respect to FIG. 1C, for example. When started, the user device security manager 151 (e.g., mSM) may read the request, identify the application based, at least in part, on its application id, for example, using OS provided mechanisms, and send an authentication request to the service provider 190 (e.g., a web service thereof) to perform authentication of the application (arrow 4). In one embodiment, the authentication request may include at least one id associated with the application, such as the AppID or Bundleid. In one embodiment, if a token (e.g., AuthN Token) is present and valid in the client machine 150, the use may not be prompted again for login.

In various embodiments, the user device security manager 151 (e.g., mSM) may forward the request by the application to access the resources (e.g., a list of listings on eBay) to the service provider 190 (arrow 6). In one embodiment, for example, the user device security manager 151 may transmit at least one of the application id (e.g., AppID) or the scope of the request to the service provider 190 (e.g., the web service thereof) to communicate the request by the application. The service provider 190 may perform access control checks to see if the received application id is potentially allowed access, and if so whether it needs user consent. If access is denied, the flow may end. The application may be informed of an error.

In various embodiments, for example, the service provider 190 may determine whether the (access) scope requested by the application needs user consent, and inform the user device security manager 151 of an outcome of the determination (arrow 7). If it is determined that the user consent is needed, the user device security manager 151 may start a flow to receive consent from the user. In one embodiment, for example, the user device security manager 151 may present (e.g., display or sound) a user interface (e.g., a pop-up window), asking the user whether he agrees to "Allow/Disallow" the application to access the requested resource(s) to the extent of the requested scope (e.g., read, write, a range of database to be searched, and so on), as illustrated in FIG. 1I. If the user consents (e.g., by clicking the "Allow" menu option) to the (access) scope requested by the application, the user device security manager 151 may request the service provider 190 to issue an application token (e.g., AppScoped Token) for the application based at least in part on the requested scope and the user consent (arrow 8). In one embodiment, the service provider 190 may utilize a policy regarding resource access control to issue the application token (e.g., AppScoped Token), for example, to determine whether the requested scope to the requested resource is in violation of the policy, and, if determines so, decline the access or modify the scope (e.g., upgrade or downgrade). If the user does not consent (e.g., by clicking the "Disallow" menu option), the flow to allow the application to access the requested resource may stop here, and an error message may be communicated to the application.

In various embodiments, upon receiving the application token (e.g., AppScoped Token), the user device security manager 151 may invoke the application by transmitting the application token to the application (arrow 9). In one embodiment, the user device security manager 151 may encrypt the application token with the nonce received from the application (e.g., as described with respect to arrow 3), for example, using symmetric encryption methods, and forwarding the encrypted application token to the application. In one embodiment, in addition to or as an alternative to forwarding the encrypted application token to the application from the user device security manager 151, the service provider 190 may trigger a push notification to the application to send the application token (as encrypted or non-encrypted) to the application directly, as illustrated by dotted arrow 9-1.

In various embodiments, as illustrated in FIG. 1I as 150-4, upon receiving the encrypted application token, the (e.g., Bookstore) application may retrieve the application token (e.g., AppScoped Token) from the received encrypted token by decrypting it using the nonce as a private key, for example. The application may use the retrieved application token to access the requested resource(s) (e.g., listings) provided by the service provider 190 (e.g., eBay), according to the (requested or modified) scope of access. In one embodiment, if the received application token is not encrypted, the application may not go through the decryption process before it can use the application token to access the requested resource(s). Other embodiments are possible.

Figure 2A:
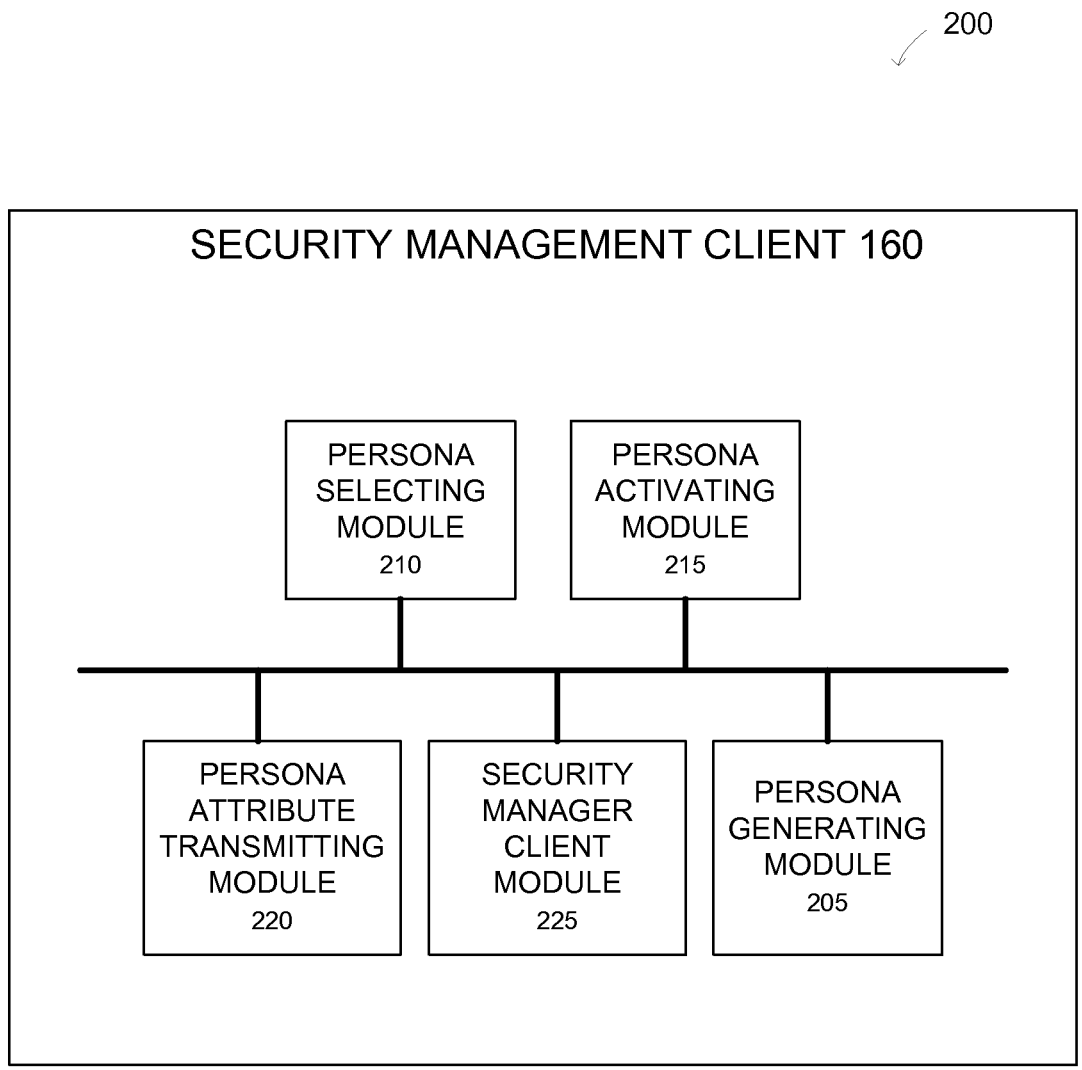
FIGS. 2A and 2B are block diagrams illustrating a security management client module, according to various embodiments.
Figure 2B:
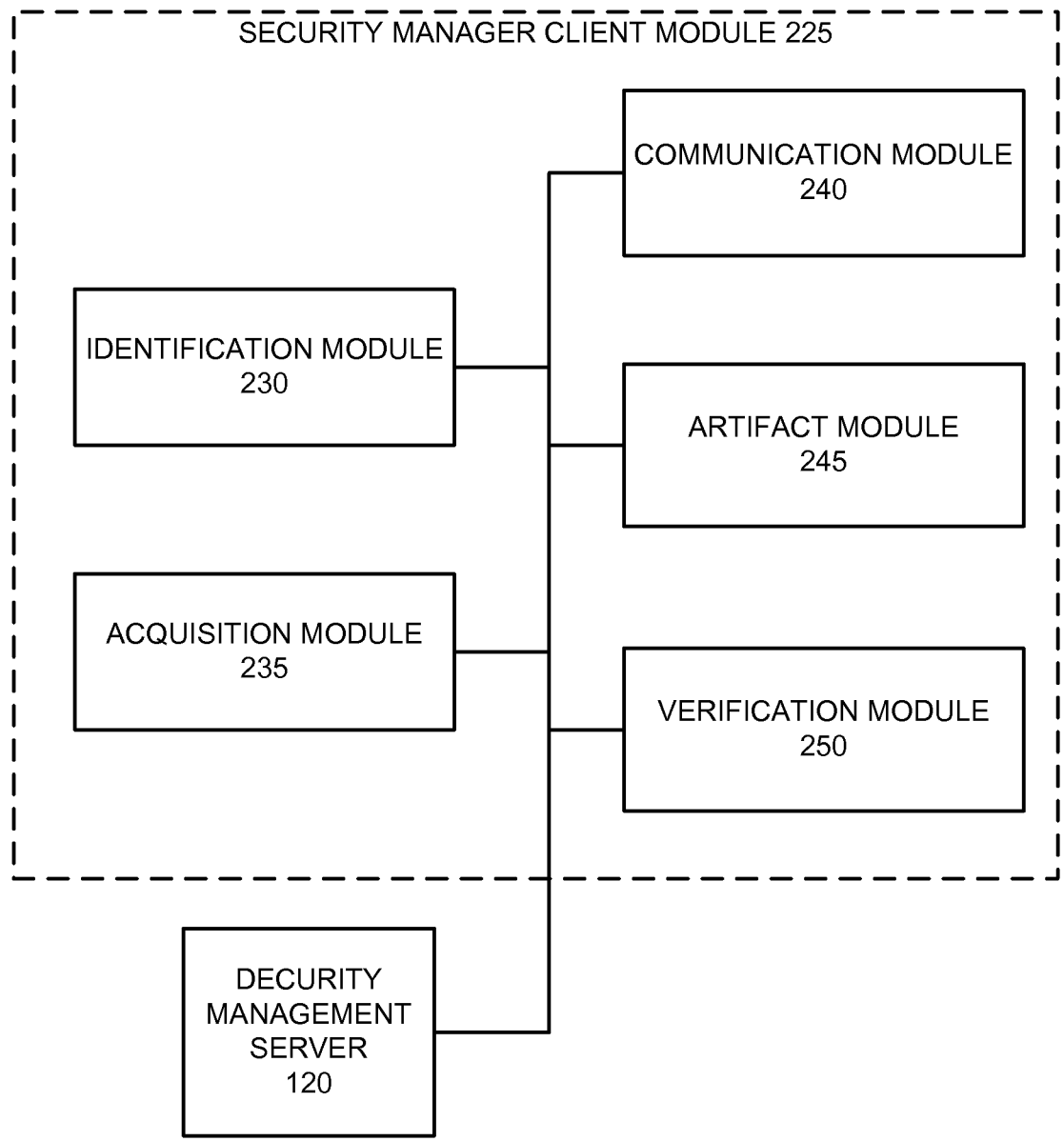

FIG. 2A shows a block diagram 200 illustrating the security management client 160, according to various embodiments. The security management client 160 (e.g., the user device security manager 151 in FIGS. 1B-1I) may comprise a persona generating module 205, a persona selecting module 210, a persona activating module 215, an persona attribute transmitting module 220 and a security manager client module 225. FIG. 2B shows a block diagram illustrating the security manager client module 225, according to various embodiments. The security manager client module 225 may comprise an identification module 230, an acquisition module 235, a communication module 240, an artifact module 245, and a verification module 250. Although each of these modules 205-225 are described as a separate module for clarity and explanation, some of these modules 205-250 may be implemented as a single entity and maintain the same functions as the corresponding separate modules.

In various embodiments, the persona generating module 205 may be configured to generate one or more personas of a user. Each persona of the one or more personas may comprise one or more attributes populated with at least one portion of user attribute information of the user, and indicate a unique identity of the user for a respective one or more of a plurality of web services provided by an associated server (e.g., the server machines 110). In various embodiments, the one or more attributes (e.g., user artifacts) of the persona may comprise at least one of a name, an account name, a password, a secret question, a secret answer, a geo location, a product preference, a lifestyle attribute, a favorite color, an age or contact information of the user. In various embodiments, the one or more attributes of the persona may comprise geo location information of a user device (e.g., the client machine 150) corresponding to the user. For example, in one embodiment, the geo location information of the user device may be provided by a satellite-based geographic information system (GIS) external to the user device. In various embodiments, the one or more attributes of the persona may comprise a picture or an image selected by the user.

The persona may be associated with a persona symbol 172 that may comprise at least one symbol assigned to the user, for example, during registration of the user and/or the client machine 150 to the security management server 120. The persona symbol 172 may comprise at least one symbol and correspond to a respective persona of a plurality of personas. Each persona may be configured to be indicative of a unique identity of the user for one or more web services and comprise one or more attributes. Each attribute of the persona may be populated with at least one portion of user attribute information of the user.

In various embodiments, the persona symbol 172 may comprise a security manager identifier (SMID) including at least one of a QR (Quick Response) code, a bar code or an RFID (Radio-frequency Identification), for example, generated by the security management server 120 in response to the user-provided (or selected) artifacts during the registration of the user or his user device, such as the client machine 150, to the security management server 120.

In various embodiments, referring back to FIG. 1A, the persona symbol 172 may comprise at least one of a letter, a number, an image, or an icon. For example, the symbol "$" may comprise the persona symbol of one persona of the user for an online payment service (e.g., PayPal). Similarly, the runner image, as shown in FIG. 1A, may comprise the persona symbol of another persona of the user for a social networking service, such as Facebook (represented by the symbol "F") or Twitter (represented by the symbol "T").

In various embodiments, the persona symbol may comprise a finger gesture 176 or a voice (not shown). The finger gesture 176 may comprise finger or electronic pen movements that are indicative of at least one of the letter, the number or a geometric shape, such as a circle, a rectangle, a triangle, a star, etc. In one embodiment, the finger and/or pen movements may be captured by a touch screen device (e.g., the display unit 170).

In various embodiments, the persona generating module 205 may be configured to generate more than one persona for the same user for the same web service. For example, still referring to FIG. 1A, the symbol "B" may comprise the persona symbol 172 associated with a buyer persona of the user for a respective service provided by eBay (represented by the symbol "E") while the symbol "S" may comprise the persona symbol 172 associated with a seller persona of that user for the same service provided by eBay.

In various embodiments, each persona of the plurality of persona symbols 172 of the user may comprise a different subset of the user attribute information as its persona attribute(s). This allows assigning different identities to the same user not only for different web services but also for a given web service.

In various embodiments, the persona generating module 205 may be configured to generate the one or more personas responsive to receiving a user request. In such a scenario, at least one of the above-described processes to generate the one or more personas, such as populating the one or more attributes of the persona with the at least one portion of user attributes, or associating the persona with the corresponding persona symbol 172, may be performed in response to one or more user inputs. Also, when generating the persona, the persona generating module 205 may receive a user selection of an existing symbol from a group of existing symbols displayed via a display (e.g., the display unit 170) to use the selected existing symbol as the persona symbol 172 of the persona being generated. In various embodiments, the group of existing symbols may be stored in a local data storage (e.g., internal or external memory) associated with the client machine 150, the server machine 110, or a third party server.

In other embodiments, the persona generating module 205 may be configured to automatically generate the one or more personas responsive to receiving, from a respective web service of the one or more web services (e.g., provided by the server machines 110), an indication that the user's activities related to the respective web service has reached a specified threshold. For example, in one embodiment, the persona generating module 205 may automatically generate the one or more personas when the number of specified user activities, such as bidding, purchasing, and/or adding comments to other users' listings, etc., with respect to the respective web service has reached the specified threshold (e.g., 5, 10 or 100 transactions) for a specified period of time (e.g., 1 week, 1 month or 1 year, etc.). In such a scenario, the persona generation module 205 may be configured, as a default, to assign already existing user attribute information and an existing symbol as the persona attributes and the persona symbol 172, respectively, and then to allow the user to change them to his or her interests.

Referring to FIG. 2A, in various embodiments, the persona selecting module 210 may receive a selection of a persona symbol 172 of the user from a plurality of stored persona symbols (e.g., the persona symbols 172 displayed on the display unit 170). In one embodiment, as noted above, each persona symbol 172 may comprise at least one symbol and correspond to a respective persona of a plurality of personas. As also noted above, each persona may indicate a unique identity of the user for a respective web service (e.g., the web services represented by the service symbols 174) and comprise one or more attributes populated with at least one portion of attribute information of the user.

For example, in various embodiments, referring to FIG. 1A, the selection may be indicated by the user's finger gesture 176 (e.g., finger or electronic pen movements) dragging a corresponding persona symbol 172 (e.g., the symbols "B" or "S") onto the service symbol 174 (e.g., the symbol "E" representing web services provided by eBay).

In various embodiments, the persona symbols 172 may be previously linked to a respective web service of the one or more web services when they are mapped to corresponding personas. In such a case, the selection of a persona may be indicated by the user's finger gesture 176 (e.g., finger or electronic pen movements), drawing a certain geometric shape (e.g., circle finger gesture 176), a letter, a number or a combination thereof. The persona selecting module 210 may be configured to capture such finger gestures 176 via a touch screen device (e.g., the display unit 170). In various embodiments, the persona symbol 172 may be selected via the user's voice describing the persona symbol 172. It is noted that the above-explained methods and other methods of selecting a persona symbol 172 may be employed separately or combined together.

Referring to FIG. 2A, the persona activating module 215 may activate the persona that corresponds to the persona symbol 172 being selected. In various embodiments, the persona activating module 215 may be configured to check an associated database to determine whether the symbol associated with the selection (e.g., the finger gesture 176 or voice description of a circle captured via the touch screen device) matches a stored persona symbol 172 in the database. Responsive to determining that there is a match between the persona symbol 172 being selected and the stored persona symbol 172, the persona activating module 215 may activate the persona corresponding to the persona symbol 172 being selected. Otherwise, the persona activating module 215 may present an error message via the display unit 170.

The persona attribute transmitting module 220 may then transmit at least one attribute of the one or more attributes of the persona being activated to the respective web service over a network (e.g., the network 140). In various embodiments, the persona attribute transmitting module 220 may be configured to automatically populate a web form provided by the respective web service with the at least one attribute. For example, in one embodiment, the web form may comprise at least one of a registration form, a login form or a message form. In yet another embodiment, the persona attribute transmitting module 220 may be configured to automatically send information indicative of a geographic location of the user device (e.g., the client machine 150) to the respective web service.

In various embodiments, for example, the security management client 160 may have application programming interfaces (APIs) for the one or more web services. By using these APIs, the persona attribute transmitting module 220 may be capable of determining contexts of each field (e.g., user id, password or preferred services field, etc.) to be filled in the web form, and populating the field with a corresponding attribute of the persona.

In various embodiments, the security manager client module 225 (e.g., the identification module 230) may identify a first request issued from an application to access remote resources associated with a web service, the application configured to execute at the user device and separate from the user device security manager 151. The security manager client module 225 (e.g., the acquisition module 235) may acquire security information of the application in response to the identifying of the request, the security information including at least one of an application identification, an access scope or a nonce of the application. The security manager client module 225 (e.g., the communication module 240) may transmit a second request to the web service to authenticate the application by the web service at least based on the application identification.

In various embodiments, the security manager client module 225 (e.g., the artifact module 245) may retrieve at least one user artifact from a SMID that is received from the web service. The security manager client module 225 (e.g., the verification module 250) may verify (e.g., perform fingerprinting of) the apparatus based on the at least one user artifact.

In various embodiments, the at least one user artifact may comprise at least one of an image, color or phrase selected by a user of the apparatus, and wherein the at least one user artifact may be previously registered at the web service in relation with the user.

In various embodiments, the SMID may comprise a string of symbols, or a quick response (QR) code.

In various embodiments, the security manager client module 225 (e.g., the artifact module 245) may receive the SMID using at least one of QR code 153 submission, redirection, push notification, manual entry or an email communication.

In various embodiments, the security manager client module 225 (e.g., the artifact module 245) may transmit the SMID to the web service to verify the apparatus in response to the identifying of the first request.

In various embodiments, the security manager client module 225 (e.g., the verification module 250) may signal a display associated with the apparatus to present at least one portion of the at least one user artifact based on receiving an indication that the apparatus is verified by the web service.

Figure 3:
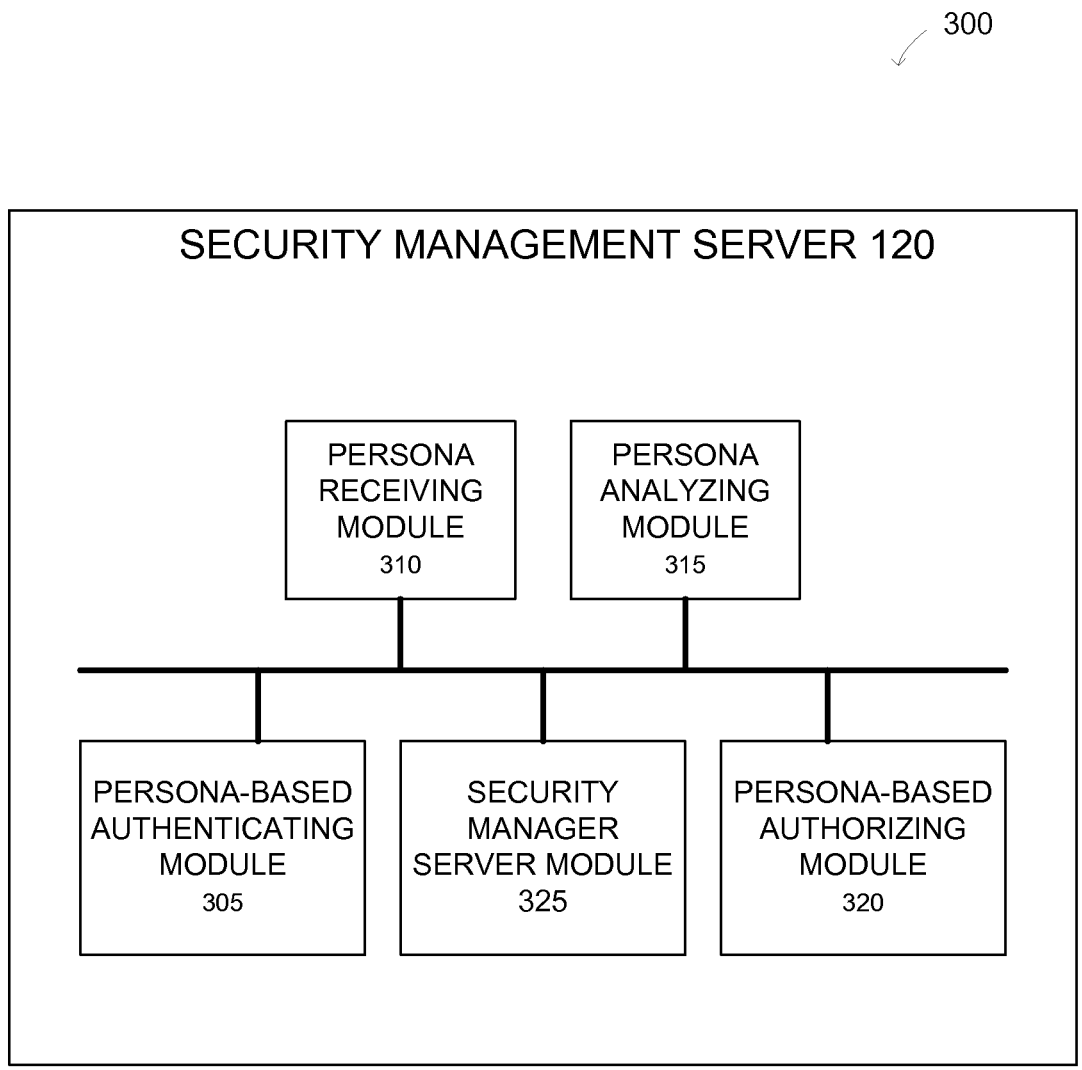
FIG. 3 is a block diagram illustrating a security management server module, according to various embodiments.

In various embodiments, the at least one user artifact may be eliminated, for example, by the security management server 120 (e.g., the security manager server module 325 as describe with respect to FIG. 3) from the web service after the apparatus being verified by the web service.

In various embodiments, the security manager client module 225 (e.g., the verification module 250) may prevent the apparatus from prompting the user with one or more user authentication pages based on identifying a valid user token associated with the user from the SMID.

More explanations regarding the functions of the security management client 160 are provided below with respect to FIG. 4.

FIG. 3 shows a block diagram 300 illustrating the security management server 120, according to various embodiments. The security management server 120 may comprises a persona receiving module 310, a persona analyzing module 315, a persona-based authenticating module 305, a persona-based authorizing module 320 and a security manager server module 325.

Referring to FIG. 3, the security manager server module 325 may assign a persona to a user or his user device, such as the client machine 150, in response to user inputs, for example, during registration of the user or the user device to a relevant web service or the security management server 120. In various embodiments, as described above with respect to FIG. 2A, the persona may be associated with a persona symbol 172, for example, by the security manager server module 325. For example, in one embodiment, the persona symbol 172 may comprise at least one of a QR code 153, a bar code, or an RFID, that includes information indicating attributes of the persona, such as a set of artifacts related to (or selected by) the user.

Referring to FIG. 3, the persona receiving module 310 may be configured to receive, via a network (e.g., the network 140), an indication of activation of a persona on a user device (e.g., the client machine 150) corresponding to a user. For example, the persona may comprise one that corresponds to one of the plurality of persona symbols 172. In various embodiments, the indication of activation of the persona may be transmitted from the user device (e.g., via the security management client 160) in response to detecting (e.g., by the security management client 160) a request from an application running on the user device to access resources controlled by a web service providing the application.

Once the indication of activation of the persona on the user device is detected, in various embodiments, the security manager server module 325 may verify the identification of the application. For example, in one embodiment, the security manager server module 325 may use information sent from the user device (e.g., via the security management client 160), such as a bundled identification or an application identification of the application, in order to verify the application.

The persona analyzing module 315 may be configured to determine whether the persona indicated as being activated on the user device matches a stored persona in memory (not shown) associated with a server (e.g., the server machines 110) on which the persona analyzing module 315 may execute. In various embodiments, the indication may comprise the persona symbol 172 that corresponds to the persona being activated, and the persona analyzing module 315 may be configured to compare the persona symbol 172 included in the indication to a stored persona symbol 172 in the memory associated with the server to authenticate the persona being activated.

The persona-based authenticating module 305 may be configured to automatically authenticate (e.g., log in) the user to a corresponding web service (e.g., services provided by eBay, Facebook or Twitter represented by the symbols "E", "F" and "T", respectively) to which the persona being activated on the user device is linked. In various embodiments, the authentication of the user may be based on determining that the persona being activated on the user device matches the stored persona without separately receiving the user's authentication information, such as login information (e.g., user id and password), from the user device.

In various embodiments, the indication of the activation of the persona may comprise at least a portion of the information regarding the user device itself, such as an IP (internet protocol) address and/or a phone number associated with the user device. Thus, in various embodiments, the indication of activation of the persona may not include a password or a user identification which may comprise textual information. In such a scenario, the persona-based authenticating module 305 may be configured to compare the user device information included in the indication with stored user device information corresponding to the stored persona to determine whether the persona being activated on the user device matches the stored persona. This allows one or more of same persona symbols 172 to be used for one or more users as long as the one or more users use different user devices.

Once the user is authenticated (e.g., logged in), for example, by the persona-based authenticating module 305 to the respective web service, the persona-based authorizing module 320 may authorize the user with a different level to provide a different set of personalized services to the user device based on the persona being activated on the user device. For example, in various embodiments, the persona-based authorizing module 320 may be configured to authorize the user for a first personalized service (e.g., a set of buyer functions) of the corresponding web service (e.g., eBay) based on determining that the persona being activated on the user device matches a first stored persona (e.g., buyer persona represented by the symbol "B").

Similarly, the persona-based authorizing module 320 may be also configured to authorize the user for a second personalized service (e.g., a set of seller functions) of the same web service (e.g., eBay) based on determining that the persona being activated on the user device matches a second stored persona (e.g., seller persona represented by the symbol "S"). This allows the web service to provide the user with a plurality of different identities each associated with a different personalized service (e.g., a set of functions) for the same web service.

In various embodiments, the web service may be provided by the same server (e.g., the server machines 110) in which the security management server 120 runs. In yet other embodiments, the web service may be provided by a third party service provider 190. In such a scenario, the security management server 120 may be configured to operate as an authentication and authorization (AAA) server for the third party service provider 190, and the persona-based authorizing module 320 may be configured to receive at least one of the first and second personalized services of the web service from a different server (not shown) associated with the third party service provider 190. For example, APIs for the web service may be used by the persona-based authorizing module 320 to obtain the corresponding personalized service from the web service.

In various embodiments, the security manager server module 325 may be configured to issue an application token to the security management client 160 in response to an application token request transmitted from the security management client 160. In one embodiment, for example, the security manager server module 325 may request user consent from the security management client 160 before issuing the application token. More explanations regarding the functions of the security management server 120 are provided below with respect to FIG. 5.

Each of the modules described above with respect to FIGS. 1A-3 may be implemented by hardware (e.g., circuit), firmware, software or any combinations thereof. Although each of the modules is described above as a separate module, the entire modules or some of the modules in FIGS. 1A-3 may be implemented as a single entity (e.g., module or circuit) and still maintain the same functionality. Still further embodiments may be realized. Some of these may include a variety of methods. The system 100 and/or its component apparatus (e.g., 110 or 150) in FIGS. 1A-3 may be used to implement, among other things, the processing associated with the methods 400 and 500 of FIGS. 4 and 5 discussed below.

Figure 4:
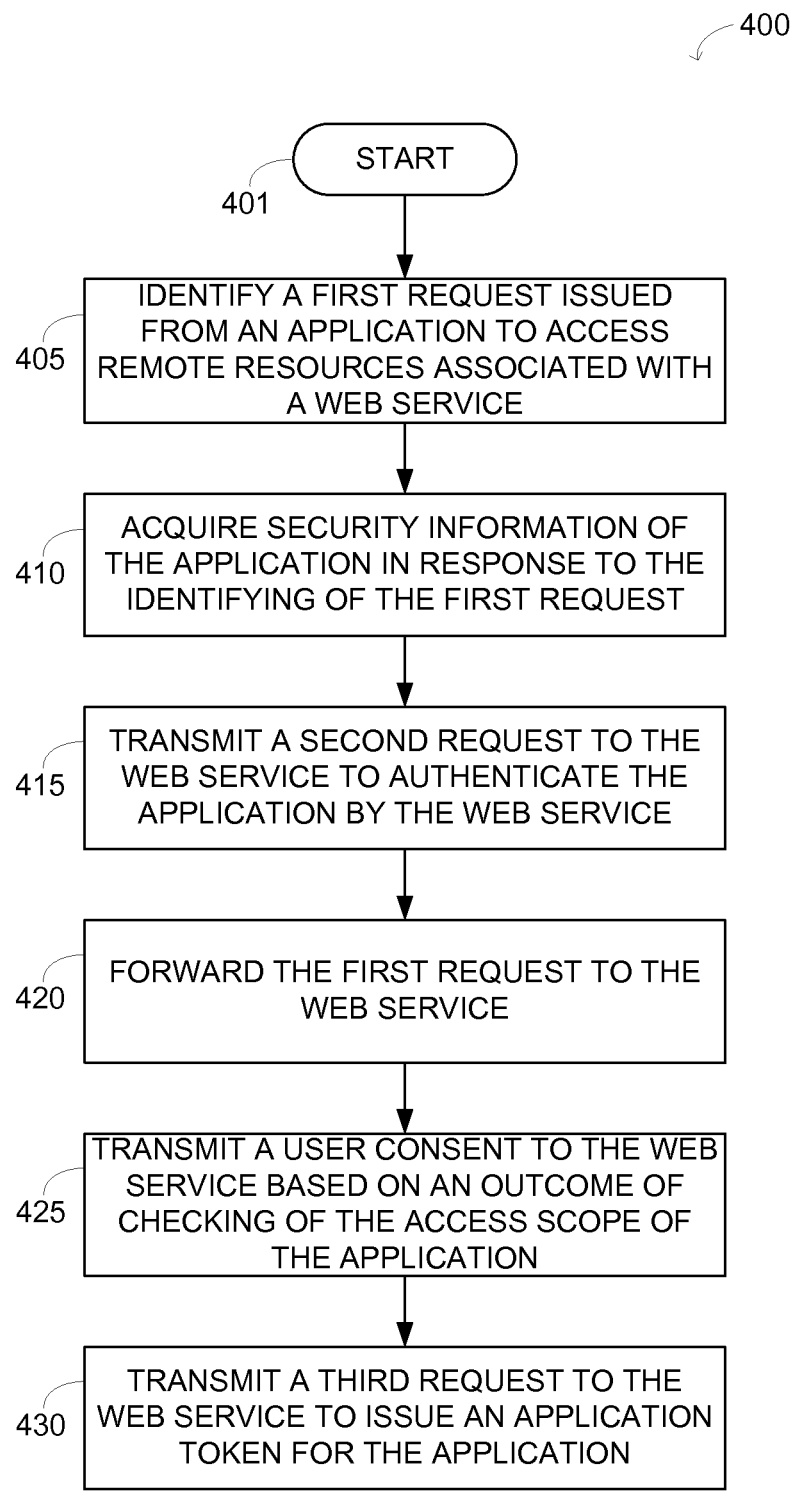
FIG. 4 is a flow diagram illustrating methods at a client machine for authenticating and/or authorizing an application, a user or a user device for a web service, according to various embodiments.

FIG. 4 shows a flow diagram illustrating a method 400 at a client (e.g., using the security management client 160 of the client machine 150) for authenticating and/or authorizing a user for a web service using personas of the user, according to various embodiments. For example, in various embodiments, at least one portion of the method 400 may be performed by the security management client 160 of FIG. 1A.

The method 400 may commence at operation 401 and proceeds to operation 405, where a first request issued from an application to access remote resources associated with a web service may be identified, for example, by a user device security manager 151 (e.g., the identification module 230) of a user device (e.g., the client machine 150) corresponding to a user of the web service. In one embodiment, for example, the application may execute at the user device, and exist separate from the user device security manager (e.g., the security management client 160).

At operation 410, security information of the application may be acquired, for example, by the user device security manager 151 (e.g., the acquisition module 235) in response to the identifying of the first request. In one embodiment, the security information may include at least one of an application identification, an access scope or a nonce of the application.

At operation 415, a second request may be transmitted from the user device security manager 151 (e.g., the communication module 240) to the web service to authenticate the application by the web service based at least in part on the application identification.

At operation 420, the first request to the web service may be forwarded to the web service based on receiving an indication from the web service that the application is authenticated at the web service, for example, by the security management server 120 (e.g., the security manager server module 325). In various embodiments, the first request may be forwarded to the web service along with an access scope for the remote resources.

At operation 425, a user consent may be transmitted to the web service from the user device, for example, via the user device security manager 151 (e.g., the verification module 250) based on an outcome of checking of the access scope of the application by the web service with respect to the requested resources.

At operation 430, a third request may be transmitted, for example, by the user device security manager 151 (e.g., the verification module 250), to the web service to issue an application token for the application.

In various embodiments, the method 400 may further comprise encrypting, for example, by the user device security manager 151 (e.g., the verification module 250), the application token issued from the web service with the nonce of the application. The encrypted token may be forwarded to the application for example, from the user device security manager 151 (e.g., via the verification module 250).

In various embodiments, the nonce may be transmitted to the application along with the encrypted token, for example, from the user device security manager 151 (e.g., via the verification module 250).

In various embodiments, the encrypted token may be decrypted by the application. For example, in one embodiment, the application may decrypt the encrypted token using the nonce transmitted along with the encrypted token.

In various embodiments, the application may be prevented, for example, by the user device security manager (e.g., the verification module 250) from accessing the requested resources until the application transmits the token retrieved from the encrypted token to the web service and the token is verified as matching by the web service or by the security management server 120.

In various embodiments, the application may comprise a mobile application configured to execute on a mobile device, such as the client machine 150. In such a case, the application identification may comprise mobile application identification separate from an identification of a non-mobile version of the application.

In various embodiments, the security information associated with the application may be provided in the form of a system development kit (SDK) included in the application.

In various embodiments, an authentication and/or authorization of the application, the user or the user device may be performed by the one or more web services being accessed by the application, and/or by a third party authentication and authorization service provider 190 to automatically log in the user to the one or more web services, and to provide the user with personalized services based on his persona(s). More explanations regarding the automatic log in of the user, and provision of the personalized services based on personas are provided below with respect to FIG. 5.

Figure 5:
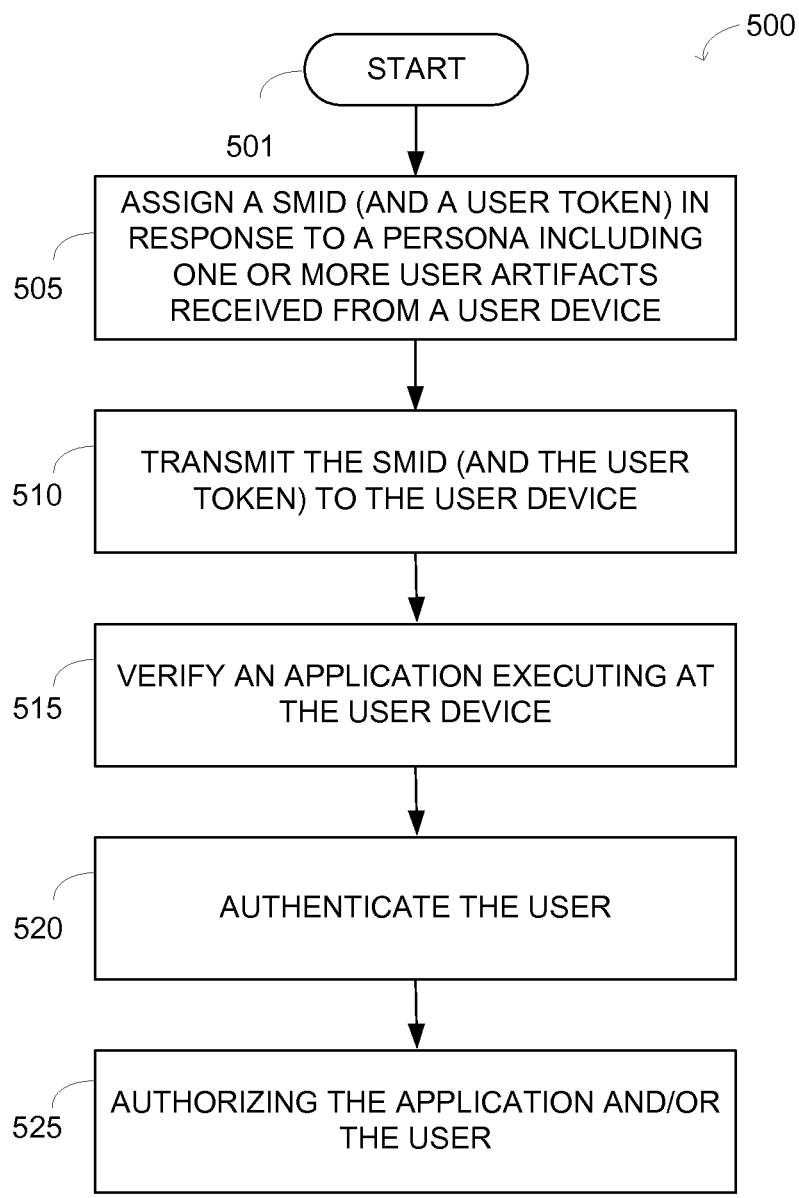
FIG. 5 is a flow diagram illustrating a method at a server machine for authenticating and authorizing an application, a user or a user device for a web service, according to various embodiments.

FIG. 5 shows a flow diagram illustrating a method 500 at a server (e.g., using the security management server 120 of the server machine 110) for authenticating and/or authorizing an application, a user and/or a user device for a web service based on personas of the user, according to various embodiments. For example, in various embodiments, at least one portion of the method 500 may be performed by the security management server 120 of FIG. 1A.

The method 500 may commence at operation 501 and proceed to operation 505, where a SMID may be assigned, for example, by the persona-based authenticating module 305, in response to a persona including one or more user artifacts received from a user device (e.g., the client machine 150) corresponding to the user, for example, during registration of the user, the user device or an application to the security management server 120. In various embodiments, the SMID may comprise at least one of a QR code 153, a bar code or an RFID including information indicating the persona (and its associate user artifacts). In various embodiments, a user token (e.g., OAuth Token) may be additionally assigned to the user.

At operation 510, the SMID may be transmitted, for example, by the security manager server module 325, to the user device as a result of registration of the user or the user device to the web service or the security management server 120. In various embodiments, if previously assigned to the user, then the user token (e.g., OAuth Token) may also be transmitted to the user device.

At operation 515, in response to a request transmitted from the user device upon detecting (e.g., by the security management client 160) an access request from an application to web resources, the identification of the application may be verified, for example, by the security manager server module 325. For example, in various embodiments, one or more identifications, such as Bundleid or AppID, of the application may be transmitted from the user device (e.g., by the security management client 160), and the transmitted identifications may be compared with existing identification stored, for example, at a storage device associated with the server machine 110. An outcome of the comparing may be transmitted to the user device as at least part of the verification result.

At operation 520, the user may be authenticated. For example, in various embodiments, the user may be automatically authenticated, for example, by the persona-based authentication module 305, to the web service or the security management server 120 based on the user token (e.g., OAuth Token) previously transmitted to the user device.

In various embodiments, the user may be authenticated, for example, by the persona-based authenticating module, based at least in part on a persona activated on the user device, for example, if the persona is previously registered with the security management server, as described above with respect to FIGS.

In either case, in various embodiments, the user may be authenticated without requiring secret user attributes, such as a password, from the user.

At operation 525, the user, the user device corresponding to the user, or the application may be authorized, for example, by the persona-based authorizing module, for one or more personalized services (or functions) of the corresponding web service and/or their associated web resources, for example, based on one or more persona attributes of the persona being activated and/or the user authentication. For example, in various embodiments, the user (or the device corresponding to the user) may be authorized for a first personalized service of the corresponding web service based on determining that the persona being activated matches a first stored persona. Similarly, the user (or the device corresponding to the user) may be authorized for a second personalized service of the corresponding web service based on determining that the persona matches a second stored persona.

In various embodiments, an application token may be generated and transmitted, for example, by the security management server module 325, to the user device (e.g., via the communication module 240). In one embodiment, before the generating and transmitting the application token, the security management server module 325 may receive a request to issue the application token from the user device (e.g., via the security management client 160). Also, in one embodiment, the security management server module 325 may further request and receive a user consent from the user, for example, from the user device (e.g., via the security management client 160).

In various embodiments, the one or more personalized services and their associated web resources may be provided based on one or more user authentication/authorization policies stored, for example, in a (local or remote) storage device accessible to the security management server 120.

The methods 400 and/or 500 may be performed by processing logic that may comprise hardware (e.g., dedicated logic, programmable logic, microcode, etc.), such as at least one processor, software (such as run on a general purpose computing system or a dedicated machine), firmware, or any combination of these. It is noted that although the methods 400 and 500 are explained above with respect to the server machine 110 and/or client machine 150 in FIG. 1A for convenient understanding, those skilled in the art will recognize that the methods 400 and 500 may be performed by other systems and/or devices that provide substantially the same functionalities as the server machine 110 and/or client machine 150.

Although only some activities are described with respect to FIGS. 4-5, the methods 400 and 500, according to various embodiments may perform other activities, such as operations performed by the display unit 170 in FIG. 1A and/or an API (not shown) located in the server machines 110 or client machine 150 in FIG. 1A, in addition to and/or in alternative to the activities described with respect to FIGS. 4-5.

The methods 400 and 500 described herein do not have to be executed in the order described, or in any particular order. Moreover, various activities described with respect to the methods 400 and 500 identified herein may be executed in repetitive, serial, heuristic, parallel fashion or any combinations thereof. The individual activities of the methods 400 and 500 shown in FIGS. 4-5 may also be combined with each other and/or substituted, one for another, in various ways. Information, including parameters, commands, operands, and other data, may be sent and received between corresponding modules or elements in the form of one or more carrier waves. Thus, many other embodiments may be realized.

In various embodiments, the methods 400 and 500 shown in FIGS. 4 and 5 may be implemented in various devices, as well as in a machine-readable medium, such as a storage device, where the methods 400 and 500 are adapted to be executed by one or more processors. Further details of such embodiments are described below with respect to FIG. 6.

Figure 6:
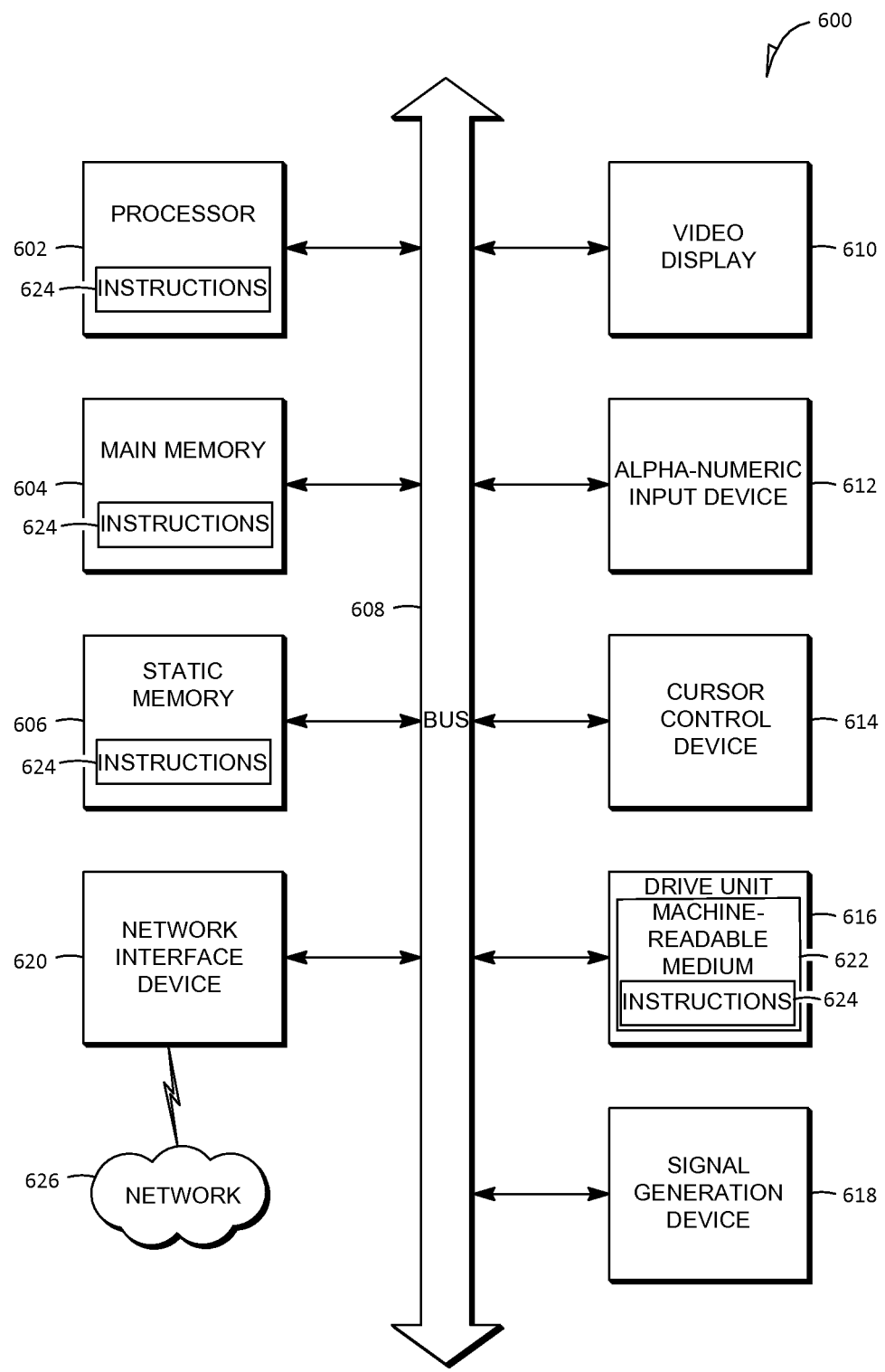
FIG. 6 is a diagrammatic representation of a machine in the example form of a computer system, according to various embodiments.

FIG. 6 is a diagrammatic representation of a machine (e.g., the server machine 110 or the client machine 150) in the example form of a computer system 600, according to various embodiments within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies or functions described herein. The software 624 may also reside, completely or at least partially, within the main memory 604 and/or within the processor 602 during execution thereof by the computer system 600, the main memory 604, static memory 606 and the processor 602 also constituting machine-readable media. The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments. The term "machine-readable medium" shall accordingly be taken to include, but not be limited to, solid-state memories, optical media, and magnetic media.

Thus, a method and system for authenticating and/or authorizing an application, a user or a user device for web services using the user device security manager (e.g., mSM) were described. Although the disclosure has been described with reference to specific example embodiments, it will be evident that various modifications and changes may be made to these embodiments without departing from the broader spirit and scope of the disclosure. The various modules discussed may be implemented in hardware, software, or a combination of these. Accordingly, the specification and drawings are to be regarded in an illustrative rather than a restrictive sense.

In various embodiments, enhanced authentication and/or authorization of the application, user or user device, and user feedback mechanism, may result because the need to consider lifecycles of the application, such as redistribution of the application to users, is reduced. In various embodiments, the user device security manager 151 may serve as a secure interface to manage tokens (e.g., OAuth) and/or communicate alerts on behalf of the application. In various embodiments, the user device security manager 151 may provide anti-phishing mechanisms (e.g., pre-registered image) to help users identify the application before they provide their credentials to the application.

In various embodiments, the user device security manager 151 may employ OAuth protocols, for example, by implementing a "password anti-pattern" to facilitate access to remote (e.g., web) resources and services by a client, such as a mobile application, based at least in part on a 'scoped' token. In one embodiment, for example, the scoped token may be configured to constraint the access by the (mobile) application, and to allow at least one of the resource and service providers 190 or the end users of the (mobile) application to revoke the scoped tokens if needed. In various embodiments, the user device security manager 151 may employ native functionalities of the application running on the user device, such as mobile platforms. This allows adding enhanced security intelligence and/or capability on the user device compared to existing application-based or web-service based user or application authentication and/or authorization.

In various embodiments, the user device security manager 151 may communicate closely with backend web service platforms, such as e-commerce (e.g., eBay) or social networking (e.g., Facebook). This allows dynamically adapting the application, user and/or user device to constantly changing, increasing or decreasing security level associated with the web service. For example, in one embodiment, a stronger authentication/authorization may be enforced if a suspicious location change of the mobile device is detected, indicating a potential loss of the mobile device. In various embodiments, the user device security manager 151 may provide the user with tools to manage security information associated with the user or the application, such as password or profile reset or token cache and so on.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   one or more hardware processors; and
   a non-transitory machine-readable medium for storing
      instructions that, when executed by the one or more hardware processors, cause the one or more hardware processors to perform operations comprising:
identifying an access request for an application to access a remote resource associated with a web service;
automatically retrieving at least one user artifact from a security manager identifier (SMID), the SMID including a quick response (QR) code that represents one or more artifacts previously provided by a user;
automatically performing fingerprinting of the user device based on matching the at least one user artifact and a stored artifact;
transmitting the access request based on the performing of the fingerprinting of the user device; and
in response to the transmitting of the access request, receiving a resource access authorization for the application.

2. The system of claim 1, wherein the at least one user artifact comprises at least one of an image, color, or phrase selected by the user; and wherein the at least one user artifact is previously registered at the web service in relation with the user.

3. The system of claim 1, wherein the QR code is generated during a registration process associated with a user device security manager.

4. The system of claim 1, wherein the operations further comprise:
receiving the SMID using at least one of QR code submission, redirection, push notification, manual entry, or an email communication.

5. The system of claim 1, wherein the operations further comprise:
transmitting the SMID to verify the user device in response to the identifying of the access request.

6. The system of claim 1, wherein the operations further comprise:
signaling a display associated with the user device to present at least one portion of the at least one user artifact based on receiving an indication that the user device is verified by the web service.

7. The system of claim 1, wherein the at least one user artifact is to be eliminated from the web service after the user device has been verified by the web service.

8. The system of claim 1, wherein the operations further comprise:
preventing the user device from prompting the user with one or more user authentication pages based on identifying a valid user token associated with the user from the SMID.

9. A method comprising:
identifying an access request for an application to access a remote resource associated with a web service;
automatically retrieving at least one user artifact from a security manager identifier (SMID), the SMID including a quick response (QR) code that represents one or more artifacts previously provided by a user;
automatically performing fingerprinting of the user device based on matching the at east one user artifact and a stored artifact;
transmitting the access request based on the performing of the fingerprinting of the user device; and
in response to the transmitting of the access request, receiving a resource access authorization for the application.

10. The method of claim 9, wherein the at least one user artifact comprises at least one of an image, color, or phrase selected by the user, and wherein the at least one user artifact is previously registered at the web service in relation with the user.

11. The method of claim 9, wherein the QR code, is generated during a registration process associated with a user device security manager.

12. The method of claim 9, further comprising:
receiving the SMID using at least one of QR code submission, redirection, push notification, manual entry or an email communication.

13. The method of claim 9, further comprising:
transmitting the SMID to verify the user device in response to the identifying of the access request.

14. The method of claim 9, further comprising:
signaling a display associated with the user device to present at least one portion of the at least one user artifact based on receiving an indication that the user device is verified by the web service.

15. The method of claim 9, wherein the at least one user artifact is to be eliminated from the web service after the user device has been verified by the web service.

16. The method of claim 9, further comprising:
preventing the user device from prompting the user with one or more user authentication pages based on identifying a valid user token associated with the user from the SMID.

17. A non-transitory machine-readable storage medium storing instructions that, when executed by one or more hardware processors, cause the one or more hardware processors to perform operations comprising:
identifying an access request for an application to access a remote resource associated with a web service;
automatically retrieving at least one user artifact from a security manager identifier (SMID), the SMID including a quick response (QR) code that represents one or more artifacts previously provided by a user;
automatically performing fingerprinting of the user device based on matching the at least one user artifact and a stored artifact;
transmitting the access request based on the performing of the fingerprinting of the user device; and
in response to the transmitting of the access request, receiving a resource access authorization for the application.

18. The non-transitory machine-readable storage medium of claim 17, wherein the operations further comprise:
receiving the SMID using at least one of QR code submission, redirection, push notification, manual entry or an email communication.

19. The non-transitory machine-readable storage medium of claim 17, wherein the operations further comprise:
transmitting the SMID to verify the user device in response to the identifying of the access request.

20. The non-transitory machine-readable storage medium of claim 17, wherein the operations further comprise:
signaling a display associated with the user device to present at least one portion of the at least one user artifact based on receiving an indication that the user device is verified by the web service.

* * * * *